United States Patent

Calvin et al.

[11] Patent Number: 5,805,291
[45] Date of Patent: Sep. 8, 1998

[54] TRAVERSING THICKNESS MEASUREMENT APPARATUS AND RELATED METHOD

[75] Inventors: Timothy Wayne Calvin, Dunwoody; Edward Conrad Schneider, Marietta; Scott M. Caillier, Atlanta, all of Ga.

[73] Assignee: Systronics, Inc., Norcross, Ga.

[21] Appl. No.: 689,822

[22] Filed: Aug. 14, 1996

[51] Int. Cl.$^6$ .................................................. G01N 21/84
[52] U.S. Cl. ........................ 356/429; 356/381; 356/385; 250/559.12; 250/555.27
[58] Field of Search .................................. 356/381, 385, 356/429; 250/559.12, 559.22, 559.15, 559.27

[56] References Cited

U.S. PATENT DOCUMENTS

| | | | |
|---|---|---|---|
| 3,856,414 | 12/1974 | Menary | 250/559.27 |
| 4,166,700 | 9/1979 | Bowen et al. | 356/381 |
| 4,311,392 | 1/1982 | Yazaki et al. | 356/381 |
| 4,572,650 | 2/1986 | Okunda | 250/559.12 |
| 4,766,647 | 8/1988 | Ackermann, Jr. et al. | 19/22 |
| 4,962,569 | 10/1990 | Hosel | 19/106 |
| 4,973,343 | 11/1990 | Frazee, Jr. et al. | 65/1 |
| 4,991,969 | 2/1991 | Tokumaru et al. | 356/381 |
| 5,001,356 | 3/1991 | Ichikawa | 356/381 |
| 5,010,494 | 4/1991 | Lord | 364/507 |
| 5,075,622 | 12/1991 | Konii et al. | 356/381 |
| 5,134,755 | 8/1992 | Jornot et al. | 19/239 |
| 5,194,911 | 3/1993 | Stutz | 356/242 |
| 5,448,361 | 9/1995 | Patton | 356/384 |
| 5,453,625 | 9/1995 | Lawson et al. | 250/459.1 |
| 5,496,407 | 3/1996 | McAleavey | 118/677 |
| 5,530,237 | 6/1996 | Sato et al. | 250/201.4 |

*Primary Examiner*—Frank G. Font
*Assistant Examiner*—Zandra V. Smith
*Attorney, Agent, or Firm*—The Law Office of Jon M. Jurgovan

[57] ABSTRACT

The invention is directed to an apparatus for measuring the thickness of flexible sheet material such as cloth, carpet, paper, sheet metal or plastic, for example. The apparatus includes a break member over which the sheet material is folded and advances. The apparatus also includes a light source and a light sensor that are preferably included in a laser scan micrometer. The apparatus also includes a carriage movable in a direction parallel to the break member. The light source is mounted to the carriage so that it opposes one side of the break member, and casts a shadow whose linear extent is indicative of the sheet material's thickness. The light sensor is mounted to the carriage on the opposite side of the break roller from that on which the light source is positioned. The light sensor and the light source can thus be used to generate sheet material thickness data at any predetermined position across the sheet material. The apparatus can include a traversing unit that drives the carriage to traverse the sheet material. The traversing unit is controlled by the apparatus' traverse controller. The apparatus can also include a processor, a user interface, a memory and a display, that can be used to generate various displays. An embodiment of the apparatus additionally includes an inductive gauging sensor mounted to the carriage, that is used with the light sensor to generate sheet material thickness data. The invention also includes a related method.

37 Claims, 9 Drawing Sheets

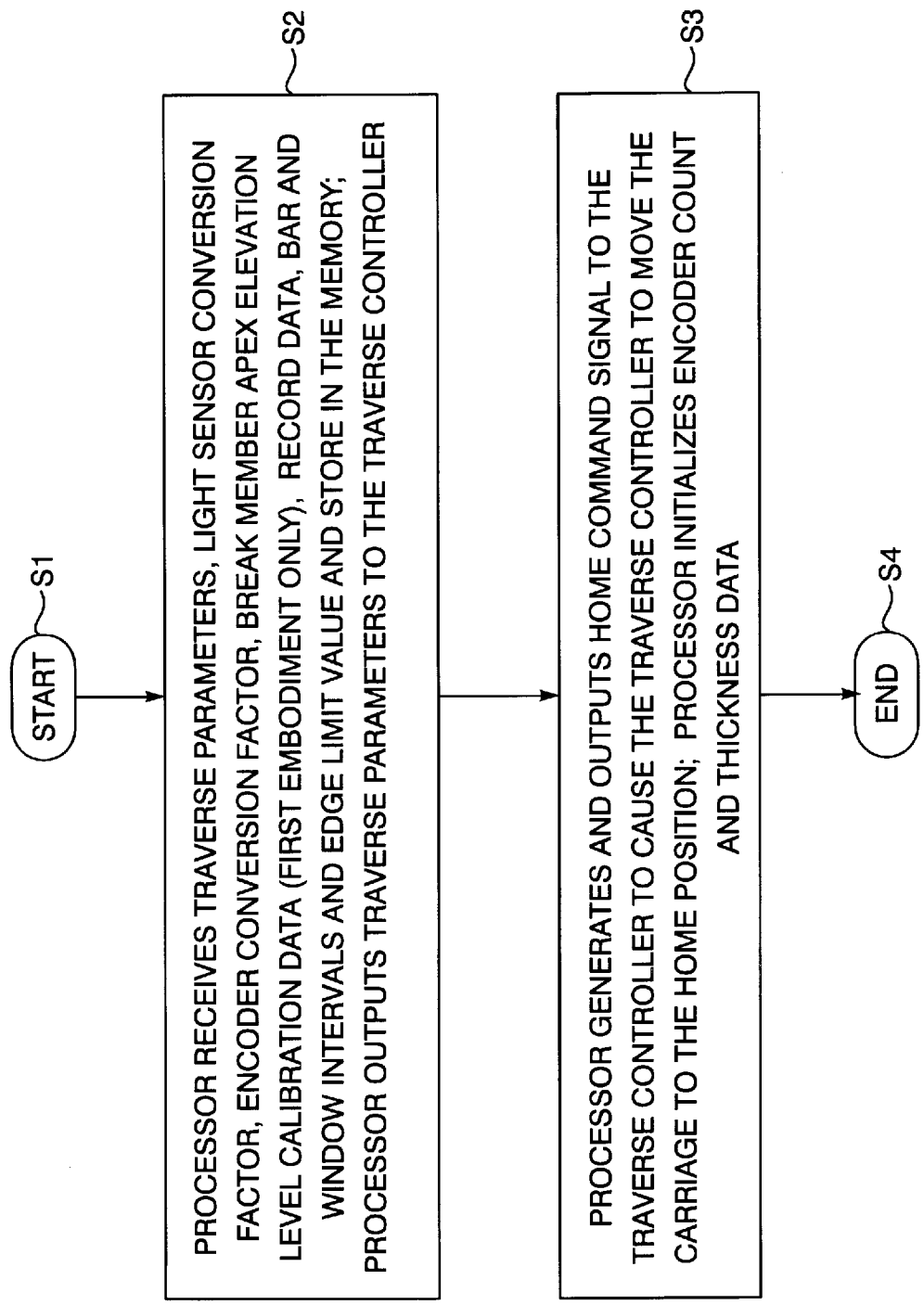

TRAVERSING THICKNESS MEASUREMENT APPARATUS AND RELATED METHOD

BACKGROUND OF THE INVENTION

1. Field of the Invention

This invention is directed to an apparatus for measuring the thickness of a sheet material moving in a production line or the like, and a related method. The apparatus and method of this invention are useful in the performance of quality control, and diagnosis and resolution of errors and problems occurring in the production of sheet material.

2. Description of the Related Art

In the manufacture of sheet materials such as textiles, carpets, paper products, plastics, sheet metals and other material, there is often a need to determine and monitor the thickness of the sheet material as it moves in a production line. A first previously-known device for performing sheet thickness measurements has a roller over which the sheet material folds along its widthwise extent as the sheet material moves along its lengthwise extent through the production line. On one side of the roller, a stationary, elongated fluorescent light is positioned parallel to the roller, and on the opposite side of the roller, a camera is positioned to receive light generated by the fluorescent light. A reference level is established by noting the linear extent of the light received by the camera when the sheet material is not present. When the sheet material is loaded in the device, the camera receives only light that is not blocked by the sheet material where it folds over the roller. The linear extent of the light received by the camera relative to the reference level, is indicative of the sheet material's thickness. The camera thus generates an output signal indicative of the sheet material's thickness. To obtain thickness measurements at various positions along the widthwise extent of the sheet material, the camera is mounted to a movable platform that is driven to traverse the sheet material along its widthwise extent. The movable platform is mounted on a cross beam on which are arranged metal fingers at spaced intervals. A sensor mounted on the platform is tripped when the platform moves into proximity with a finger. The sensor is coupled to a processor board, called a 'smartboard'. The output of the camera is connected to the smartboard that reads the camera output when triggered to do so by the sensor upon passing a finger mounted on the cross beam. The smartboard calculates the thickness of the sheet material based on the output signal from the camera. The thickness measurements are output from the smartboard to a personal computer (PC) that generates a display based on the smartboard's output signal. The PC could calculate and display a value of the average of the thickness measurements taken at each sensor position along the cross beam. Also, the PC outputs the control commands for movement of the camera platform, to the smartboard that in turn generates movement command signals supplied to a motor controller. In response to the command signal, the motor controller generates output signals to control the motor to move the camera platform to traverse the sheet material as it moves along its lengthwise extent through the device.

A second previously-known device for performing sheet material thickness measurements is similar to the first device described above, but rather than having an elongated, stationary fluorescent light, the second device has a separate movable platform for a comparatively small light. In the second device, an electric motor is coupled to two belt drives used to move respective camera and light platforms in tandem along the widthwise extent of the sheet material.

The maintenance and modification of the software codes for both the PC and the smart board has proved to be extremely problematic. For example, if a platform traverse parameter such as the traverse distance that the camera platform is to be moved across the sheet material, is changed to accommodate a sheet material with a broader or narrower width than that previously used in the device, the software codes for both the personal computer and the smartboard must be modified. This modification requires searching the code of the computer program and the smartboard for each occurrence of the traverse distance parameter to change the code to the modified traverse distance value. Considering that the codes for the PC and the smartboard can be ten thousand or more lines, the process of making a relatively simple modification of the device to accommodate a different traverse distance is extremely tedious and time-consuming. It would be desirable to overcome this disadvantage of the previously-known device described above.

Another problem that has been identified in connection with the first above-described device is that the fluorescent light tube comes in sizes that are limited in length. Therefore, the device's traverse distance is either limited to the length of the tube or more than one tube must be positioned end-to-end to extend the traverse distance, necessarily resulting in light-emission gaps between the ends of any two adjacent tubes. The gaps between adjacent tube ends results in erroneous thickness measurements. Further, fluorescent tubes can be relatively expensive to use and replace. Also, the fluorescent light tubes of the device cannot be replaced as sheet material moves in the production line without reaching over moving parts of the device machinery and the moving sheet material, thus presenting a significant risk of injury to a person changing the light tube by accidental contact with the moving sheet material and/or device machinery. It would be desirable to provide an apparatus that overcomes the above-described disadvantages.

With respect to the second above-described device, slippage of the belt drives can cause the camera and light platforms to become misaligned so that they do not move together when traversing the sheet material's width, thus presenting the possibility of erroneous thickness measurements. It would be desirably to provide an apparatus that overcomes the above-noted disadvantage.

Particularly for high-precision thickness measurements, rotational eccentricity and imperfections existing in the roller cause variations in the horizontal apex elevation level of the break roller, resulting in erroneous thickness measurements. Also, the apex elevation level of the break roller can vary over time due to temperature or humidity changes or bearing and roller wear. In addition, variations in tension of the sheet material as it is driven to move through the device causes the roller to deflect to varying degrees, a phenomenon that also adversely affects sheet material thickness measurements. It would be extremely desirable to overcome thickness measurement errors caused by the above conditions.

Another problem identified with the above-described devices is that the sheet material must be removed from the devices to determine the reference level of the roller in the device's calibration procedure. In many cases, removal of the sheet material from the device is extremely impractical. It would therefore be desirable to provide an apparatus that does not require removal of the sheet material for calibration.

SUMMARY OF THE INVENTION

This invention overcomes the above-noted disadvantages. The invention includes an apparatus for measuring thickness of a sheet material as it advances through the apparatus. The invented apparatus includes a break member, a carriage, a light source and a light sensor. The break member is supported in the apparatus so that its central axis (i.e., its symmetric axis) is positioned transversely to the direction in which the sheet material advances along its lengthwise extent through the apparatus. Along its widthwise extent, the sheet material folds over the break member, thus forming a 'break' in the sheet material. The carriage is mounted in the apparatus so that it can be moved in a direction along the central axis of the break member. The light source and the light sensor are mounted to the carriage on opposite sides of the break member and aligned with the break in the sheet material. The light source and the light sensor can be implemented as a laser scan micrometer. The light sensor receives the light from the light source that is not blocked by the sheet material, and generates an output signal indicative of the thickness of the sheet material based on the received light.

To obtain thickness measurements along the widthwise extent of the sheet material, the carriage can be moved to traverse the sheet material in a direction parallel to the central axis of the break member. To affect such movement, the apparatus includes a traversing unit to which the carriage is coupled. Preferably, the traversing unit is substantially sealed so that dust or lint from the sheet material does not cause maintenance problems in the traversing unit. The apparatus also includes a traverse controller that is coupled to the traversing unit. The traverse controller has an automatic mode of operation in which, in response to a start traverse signal, the traverse controller generates a control signal supplied to the traversing unit, to control the traversing unit's movement across the width of the sheet material. The traverse controller controls the movement of the traversing unit, and hence the carriage, based on pre-specified traverse parameters including the traverse speed and direction, and first and second positions along the central axis of the break roller between which the carriage is to be traversed. The traverse controller drives the carriage via the traversing unit to move from the first to the second position, or vice versa depending upon the traverse direction, until the traverse is completed. As the traverse controller controls the movement of the traversing unit to drive the carriage across the sheet material, the traverse controller activates a trigger signal each time the traversing unit moves the carriage over a traverse data interval that is preprogrammed into the traverse controller. The traverse controller also generates a traverse complete signal to signify the end of a single traverse of the carriage across the sheet material. In its manual mode of operation, the traverse controller can be controlled by a user of the apparatus to move the carriage via the traversing unit to a particular position along the break member's central axis, to monitor the sheet material thickness at that particular position. Also, in its manual mode of operation, the traverse controller can be directed by the user to move the carriage via the traversing unit, to the side of the apparatus where the carriage does not overlie the sheet material so that maintenance such as replacing the light source can be performed without the need to stop the sheet material from advancing through the apparatus.

Preferably, the apparatus includes a position encoder that generates an output signal indicative of the amount of sheet material that has advanced through the apparatus relative to a predetermined reference position (e.g., the leading edge of the sheet material) or a predetermined reference time (e.g., the temporal beginning of the traverse measurement operation). The position encoder can directly contact the sheet material or can contact a roller of the apparatus, that rotates in contact with the sheet material. The position encoder can be such that it activates an output signal each time the sheet material advances by a predetermined increment through the apparatus.

The apparatus preferably includes a processor, a user interface, a memory, a display unit and an alarm unit. The processor is coupled to the traverse controller, the light sensor and the position encoder. The processor is also coupled to the user interface, the memory, the display unit and the alarm unit. In the first embodiment of the apparatus, calibration is performed by determining the number of pixels of the light sensor that correspond to a linear unit of the sheet material (e.g., inch units). Accordingly, measurements of the thickness of the sheet material taken in terms of numbers of pixels can be converted by the processor into standard measurement units (e.g., inches) using the light sensor conversion data. Preferably, calibration of the first embodiment of the apparatus also includes the determination of the apex elevation levels of the break member at respective positions along the sheet material's width where the thickness measurements are to be taken.

After calibration, the operational mode of the first embodiment of the apparatus is initiated by the user inputting a start traverse command to the processor via the user interface. In response to the start traverse command, the processor activates the start traverse signal that is supplied to the traverse controller. In response to the start traverse signal, the traverse controller moves the carriage via the traversing unit to the first position if the carriage is not located at the first position already, and begins to move the carriage via the traversing unit, across the width of the sheet material. The processor receives the light sensor output signal in response to the activation of the trigger signal, and calculates the thickness of the sheet material based on the light sensor output signal, the light sensor conversion data and the apex level of the break member at the current traverse position that was previously determined by calibration. As the traverse controller continues to move the carriage across the sheet material, the processor accumulates thickness measurements at traverse data intervals across the sheet material. When the traverse controller detects that the carriage has reached the second position, the traverse controller stops the carriage via the traversing unit, and the traverse controller activates a traverse complete signal supplied to the processor. In response to the activation of the traverse complete signal, the processor preferably determines the minimum and maximum thickness values over the traverse, an average value over the traverse and/or average values over user-specified window or bar intervals that are segments of the entire traverse width between the first and second positions. These values are stored in the memory in association with the traverse, encoder position and window or bar interval to which the values pertain. The processor also reads the position encoder output signal and converts the signal to predetermined measurement units (e.g., feet), using encoder position conversion data prestored in the memory. The processor stores the converted position encoder data in the memory in correspondence with the sheet material thickness data and the associated traverse position data, the minimum, maximum and average thickness values over the traverse, window interval(s) and/or bar interval(s).

The processor can generate several displays based on the data stored in the memory. For example, the processor can use the display unit to generate a display of thickness values in correspondence with respective positions across the sheet material's width. The processor can also generate a bar graph display showing the average thickness values over successive user-specified bar intervals across the sheet material. Further, the processor can generate displays of the maximum, minimum and average thickness values per traverse at intervals along the lengthwise extent of the sheet material. In addition, the processor can perform a time-to-frequency domain transformation such as a fast Fourier transform (FFT), to determine whether there are any periodic variations in the thickness values at a particular traverse position along the widthwise extent of the sheet material, that indicate systemic errors in the production line system.

The processor can generate and output an alarm signal to the alarm to alert a user of the existence of an alarm condition. For example, if the processor determines that a sheet material thickness value is above or below predetermined user-specified upper and lower alarm limits, respectively, the processor generates and outputs an alarm signal to the alarm unit. Based on the alarm signal, the alarm unit generates an audio or visual indication to call the user's attention to the existence of the alarm condition.

In the preferred embodiments of the invented apparatus, the break member is a roller that is supported at opposite ends by respective bearings. As so supported, the break roller bends at its middle portion under the force of gravity. To counteract the force of gravity, the first preferred embodiment of the invented apparatus includes support rollers that are situated underneath the break roller. The support rollers are themselves rigidly supported against a solid floor or beam of the apparatus, for example, and the support rollers engage with the underside of the break roller to prevent the break roller from sagging. To reduce the occurrence of grooves in the break roller due to contact wear with the support rollers, the break roller can be chrome-plated on its outside surface.

A second embodiment of the invented apparatus includes similar elements to those described above with respect to the first embodiment. In addition, the second embodiment includes an inductive gauging sensor and a stage. The stage is mounted to the carriage in proximity to the break member, and the inductive gauging sensor is mounted to the stage. In the second embodiment, the break member is made of or contains metal so that the inductive gauging sensor generates an output signal indicative of the relative distance from the end of the inductive gauging sensor to the break member's apex. The stage is capable of moving the inductive gauging sensor in a direction toward or away from the break member so that the inductive gauging sensor can be calibrated. In calibration, the amplitude of the output signal from the inductive gauging sensor is monitored at predetermined, known distances from the break member to generate a inductive gauging sensor conversion data that is stored in the traverse controller's memory. To prepare for the operational mode, the inductive gauging sensor is positioned with the stage to ride in close proximity above, but not in contact with, the apex of the break member. In the operational mode, the processor sends a start traverse signal to the traverse controller. So that analog signals are not transmitted over long distances that could degrade signal quality, the output signals from the light sensor, the inductive gauging sensor and the position encoder are preferably coupled to the traverse controller that is more proximately located to the sensors and the encoder relative to the processor. Accordingly, in the second embodiment of the invented apparatus, the traverse controller reads at the traverse data intervals the output signals from the light sensor and the inductive gauging sensor, performs analog-to-digital (A/D) conversion on these output signals, and stores the A/D converted values in its memory. Upon completing a traverse of the sheet material, the traverse controller generates and outputs a traverse complete signal to the processor. In response to the traverse complete signal, the processor generates and outputs a send data signal to the traverse controller. In response to the send data signal, the traverse controller reads the position encoder output signal and multiplies the read encoder output signal with the predetermined encoder conversion data stored in the traverse controller's memory, to convert the encoder output signal into predetermined measurement units. Also in response to the send data signal from the processor, the traverse controller reads from its memory and converts the A/D-converted light sensor and inductive gauging sensor data into respective predetermined measurement unit values, by multiplying the A/D converted output signals by respective conversion data. The traverse controller then subtracts the converted inductive gauging sensor data from the converted light sensor data for respective traverse positions over the completed traverse, to generate sheet material thickness data in correspondence with traverse position data for the traverse. The traverse controller sends the sheet material thickness data and respective traverse position data, and the converted position encoder data, to the processor, in response to the send data signal. The processor then calculates minimum, maximum and average thickness values over the traverse, window or bar intervals, and generates displays similar to those described above with respect to the first embodiment.

Advantageously, in the first and second embodiments of the invented apparatus, the traverse controller stores and utilizes the traverse parameters including the first and second positions between which the carriage is to be traversed, the traverse speed and the traverse data interval. Therefore, the traverse parameters can be readily modified, for example, to accommodate different sheet material sizes, without making any significant changes to the processor program code stored in the processor's memory. Also, because the traverse controller is substantially dedicated to controlling the carriage traverse, the processor is freed to a relatively large degree so that it can more efficiently handle the calculation and storage of data, and the generation of displays. Also advantageous, the user can control the traverse controller in its manual mode of operation to move the carriage to a predetermined traverse position overlying the sheet material to continuously monitor sheet material thickness at that particular traverse position. The traverse controller can also be controlled by the user to move the carriage to the side of the machine to service the carriage, the light sensor or the light source, without the need for the user to reach over the moving sheet material or apparatus elements that could injure the user if contacted. Further, due to the automatic light source shut-off feature of the traverse controller, the useful life of the light source can be extended by shutting off the light source when not in use. In addition, because the traversing unit is substantially sealed, little or no dust or lint can enter inside of the traversing unit, thus reducing maintenance and extending the life of the traversing unit. Moreover, in the first embodiment of the invented apparatus, the support rollers help to prevent sagging of the break roller under the force of gravity and the tension exerted against the break roller by the production line machinery that drives the sheet material through the apparatus, and the preferred chrome-plating of the break roller reduces wear. In the second embodiment of the invention, the sagging of the break member due to gravity or sheet material tension is compensated by the inductive gauging sensor to generate highly accurate thickness measurements. If the break member is implemented as a roller, the inductive gauging sensor can compensate for roller eccentricity and imperfections. The displays generated by the processor in the invented apparatus provide thickness measurement information to the user in a readily comprehensible manner. For example, the user can designate one or more windows across the width of the sheet material, and the sheet material's average thickness value is displayed in correspondence with the window(s) to allow the user to readily determine the average thickness over a window. In addition, the user can easily compare the average thickness value for one window with that of another window or windows to determine if there are any systematic errors in the sheet material thickness. The processor can also generate a bar graph display that displays the average thickness value over a bar interval over the sheet material's width. Further, the processor can also generate a display of the maximum, minimum and average thicknesses for each traverse versus the position along the longitudinal axis (i.e., along the second direction) of the sheet material, a display that is particularly useful in determining trends in the sheet material thickness along the sheet material's lengthwise extent. In addition, the processor can perform a time-to-frequency domain transformation on the thickness values along the sheet material's lengthwise dimension to determine whether any periodic, and therefore non-random, components are present that may indicate the presence of an error in the production line machinery used to manufacture the sheet material, and the processor can generate a display of thickness versus frequency to allow a user to diagnose the frequency(ies) at which error(s) are introduced into the manufacture of the sheet material. In addition, the processor can store in the memory and display various data including the sheet number, lot number, time and date of the acquisition of thickness measurements of the sheet material, and average thickness values per traverse and/or by window, that can be used as record data to determine at a future time whether any thickness errors existed in the sheet material at the time the thickness measurements were performed.

A method in accordance with this invention includes a step of folding a sheet material along a first direction, and a step of advancing the sheet material along a second direction transverse to the first direction. The method also includes a step of mounting a light source and a light sensor on opposite sides of a carriage, and a step of situating the carriage so that the light source and light sensor face opposite sides of a folded portion of the sheet material. The method also includes a step of illuminating the sheet material with a light source from a first side of the folded sheet material, and a step of receiving light on a second side of the material that is not blocked by the folded sheet material, with a light sensor, where the received light is proportional to the sheet material's thickness. The method further includes a step of traversing a carriage to which the light source and light sensor are commonly mounted, along the first direction, and a step of displaying the sheet material thickness in correspondence with position on the sheet material along the first direction. Advantageously, the traversing of the light sensor together with the light source on a common carriage eliminates thickness measurement errors that are likely to occur if the light sensor and the light source are independently driven. Also, the carriage can be traversed over a relatively large distance without interruption in the light source that would be required in previous devices where adjacent light sources would have to be positioned end-to-end, thus leading to relatively precise sheet material thickness measurements in the invented method. Thus, the method of this invention produces far more accurate, efficiently-performed thickness measurements than possible using previous methods.

These together with other objects and advantages, which will become subsequently apparent, reside in the details of construction and operation as more fully hereinafter described and claimed, reference being made to the accompanying drawings, forming a part hereof, wherein like numerals refer to like parts throughout the several views.

BRIEF DESCRIPTION OF THE DRAWINGS

FIG. 3 is a flow chart of processing performed by the processor to prepare the apparatus for performing sheet material thickness measurements;

DESCRIPTION OF THE PREFERRED EMBODIMENTS

1. A First Preferred Embodiment of the Apparatus

Figure 1:
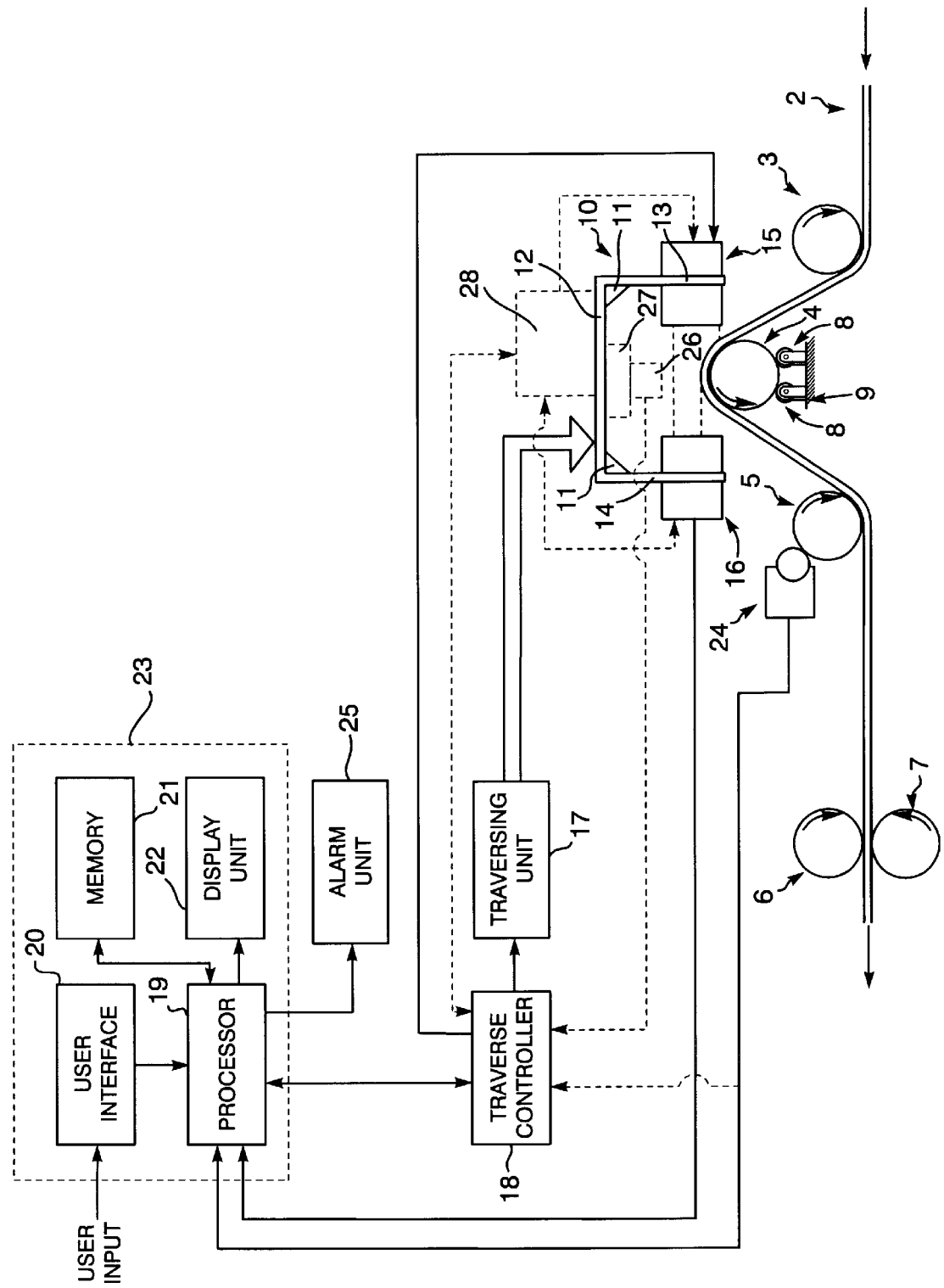
FIG. 1 is a diagram of an apparatus in accordance with this invention.

FIG. 1 is a diagram of an apparatus 1 in accordance with this invention, for measuring thickness of a sheet material 2 advancing in a direction along its lengthwise extent through the apparatus. The sheet material 2 can be a textile material, a floor covering such as carpet, a paper product, a plastic material, sheet metal or any other elongated, flexible sheet material. In the apparatus of FIG. 1, the sheet material passes underneath a guide member 3, breaks over a break member 4, and passes underneath a guide member 5 in FIG. 1. Preferably, the members 3, 4, 5 are implemented as rollers that rotate in contact with the sheet material as it advances through the apparatus, although the members 3, 4, 5 can also be implemented as fixed, non-rotating members on which the sheet material slides. The sheet material is driven to advance by drive rollers 6, 7 that engage with the sheet material from opposite sides. More specifically, one or both of the drive rollers 6, 7 are coupled to a motor (not shown) that forces the drive roller(s) to rotate and advance the sheet material 2 along its lengthwise extent through the apparatus. The drive rollers 6, 7 with coupled motor are actually parts that are external to the apparatus of this invention. It should be appreciated that the device used to advance the sheet material through the invented apparatus can be one of a wide variety of drive mechanisms other than the drive rollers and motor described above, as is readily apparent to those of ordinary skill in this technological field.

In FIG. 1, the sheet material, the members 3, 4, 5, and the drive rollers 6, 7 are shown in cross-section. The ends of the guide and break members, if implemented as rollers, are coupled to respective bearings (not shown in FIG. 1) mounted in a suitable support frame (not shown in FIG. 1). Alternatively, if implemented as fixed members, the ends of the guide and break members can be mounted directly to the support frame(s) by weldments, for example. Preferably, the guide members, the break member and the drive rollers are supported and positioned in the apparatus transversely to the direction in which the sheet material advances through the apparatus. Thus, despite the fact that the sheet material changes direction from the horizontal direction leading to the guide member 3, to a different direction between the guide member 3 and the break member 4, to yet another direction from the break member 4 to the guide member 5, and back to the horizontal direction after the guide roller 5, the sheet material nonetheless advances in a direction that is transverse to the central axes of the members 3, 4, 5 and the drive rollers 6, 7.

The break member 4 is an important element of the apparatus for sheet material thickness measurements because the break member establishes a horizontal reference level at its apex in FIG. 1, in comparison with which the sheet material's thickness is determined. Therefore, the break member should be made of a substantially rigid material such as steel or aluminum or other metal, that has a relatively smoothly curved and precise apex surface to avoid variations in the break member's apex elevation level due to imperfections. Also, if implemented with a roller, the break member should be mounted in the apparatus with high-precision bearings positioned relatively precisely in the apparatus' support frame to avoid eccentricity or other errors that would cause fluctuations in the apex level of the break roller as it rotates. Because the break roller is supported at its ends, the middle portion of the break roller will tend to sag under the force of gravity and force exerted by the sheet material against the roller due to the tension under which the sheet material is subjected for advancement through the apparatus. To prevent the break roller from sagging, support rollers 8 can be used in accordance with this invention. The support rollers 8 are themselves supported by a beam or the floor on which the apparatus rests or other fixed surface 9, and have roller members that engage with the underside of the break roller to counteract sagging due to gravity or force exerted by the sheet material, that causes the apex level of the break roller to be non-uniform. Preferably, the support rollers 8 are provided in opposing pairs with the rollers of each pair arranged on opposing sides of a vertical plane passing through break roller's center in FIG. 1 for stability. Also preferred, the support rollers are provided in pairs spaced along a direction parallel to the rotational axis of the break roller (i.e., a direction into or out of the page in FIG. 1). A commercially-available type of roller commonly used as a cam follower, has been found to be particularly useful for the support roller. This commercially-available roller has an eccentric mounting that can be used to adjust the height of the roller member. Preferably, the roller member is arranged between two mounting members that have fixed ends mounted to the aforementioned beam or floor, and ends opposite the fixed ends that define respective holes that are aligned with a hole in the central body of the roller member, that is offset from the central axis of the roller member. A bolt is inserted through the holes in the mounting members and the hole in the roller member. By loosening the bolt, the support member can be eccentrically rotated about the bolt to adjust the height of the support member and hence the degree to which it bears against the break roller. When properly adjusted, the bolt is tightened to fix the support roller between the mounting members in position against the break roller. To help to prevent the support rollers from wearing grooves in the break roller, the outer surface of the break roller can be plated with chrome or the like to resist wear.

The apparatus includes a carriage 10 that is approximately C- or U-shaped, and supported in the apparatus so that the open end of the C or U straddles, but does not contact, the break member and the sheet material breaking over the break member. The carriage is made of a substantially rigid material such as steel or aluminum or other rigid material. To reinforce and stabilize the carriage, the carriage can have angled members 11, essentially triangle-shaped, rigid plates, welded or otherwise attached between the base plate 12 and respective side plates 13, 14 of the carriage, or the carriage can be provided with other structural reinforcement if necessary, so that the carriage is substantially rigid to avoid thickness measurement errors due to vibration or the like as the carriage moves.

To the end of the side plate 13, a light source 15 is mounted. The light source 15 can be an incandescent or fluorescent bulb, for example, attached to a suitable fixture to receive electric power. Alternatively, the light source can include a model no. 170-D manufactured by Dolan-Jenner™, Inc., that generates and supplies light to first ends of a plurality of optical fibers whose opposite ends are arranged linearly along the vertical axis in FIG. 1 in the side plate 13. In any case, the light source is positioned so that it directs light toward the apex of the break member. Preferably, the light source is arranged with 30 to 40 percent of its light emitting extent arranged below the average surface of the sheet material, and the light emitting portion of the light source should extend below the apex elevation level of the break member.

To the side plate 14, a light sensor 16 is mounted to the carriage in a position opposing the light source 15 and the break member. The light sensor can be a charge-coupled device (CCD) with a linear array of picture elements (pixels) spaced at a known, constant interval and arranged along the vertical direction in FIG. 1. Such CCD arrays are commercially available from a wide variety of sources including Dalsa™, Inc. of Waterloo, Canada and Reticon™, Inc. The CCD array should have a sufficient number of pixels to extend from a position below the apex level of the break member to a position above the elevation corresponding to the largest possible thickness of the sheet material above the break member's apex level. The light sensor 15 generates an output signal that is indicative of the thickness of the sheet material, based on the light it receives from the light source. More specifically, when the sheet material is not loaded in the apparatus and the light source is activated, a portion of the light from the light source is blocked by the break member. Accordingly, those pixels of the CCD array positioned below the horizontal apex plane of the break member, being situated in the shadow of the break member, will receive no light and thus are not activated, and those pixels positioned above the break member's apex plane do receive light and are thus activated. By determining where along the pixel array the pixels transition from a deactivated state to an activated state, based on the output signal generated by the CCD array, the reference level corresponding to the break member's apex plane can be determined. When the sheet material is loaded into the apparatus as shown in FIG. 1, the pixels of the CCD array that are not activated are below a horizontal plane tangent to the apex of the sheet material where it breaks over the break member. The position along the CCD array where the pixels transition from being in a deactivated state due to their location in the shadow of the break member, and an activated state due to their situation above the horizontal plane tangent to the sheet material's apex, is indicated by the output signal generated by the CCD array. By subtracting the sheet material's apex level from the break roller's apex level, the thickness of the sheet material can be determined based on the output signal from the CCD array using the known interval between the pixels of the CCD array. More specifically, by subtracting the number of pixels activated or deactivated when the sheet material is not present in the apparatus, from the number of pixels activated or deactivated, respectively, when the sheet material is present in the apparatus, and multiplying the difference by the light sensor conversion data proportional to the interval distance between pixels determined by calibration, the sheet material thickness in predetermined measurement units (e.g., inches), can be obtained.

The apparatus includes a traversing unit 17 that is mounted in the apparatus by attachment to a beam or the like, so that the traversing unit extends in a direction parallel to the central axis of the break member. The carriage 10 is mounted to the traversing unit that moves the carriage in a direction along the break member's central axis so that the light sensor 15 and the light source 16 are spaced at substantially constant distances from the break member. The traversing unit's coupling to the carriage to control its movement is represented by the large arrow in FIG. 1. Preferably, the traversing unit is a sealed unit to prevent or reduce fouling by dust or lint, such as that available from Parker™ Corporation's Compumotorm Division located in Rohnert Park, Calif. The preferred traversing unit is elongated and has a movable platform to which the carriage can be mounted with screws or bolts, that slides along the elongated length of the traversing unit when forced to do so by the traversing unit's motor. The movement of the traversing unit's carriage mount is affected by a control signal supplied to its motor. Preferably, the traversing unit's motor is a d.c. brushless motor or a stepper motor.

The apparatus also includes a traverse controller 18. The traverse controller is preferably a programmable controller such as an 'SX 6 controller' commercially available from the aforementioned Compumotor™ Division. The traverse controller is preferably preprogrammed with carriage traverse parameters such as first and second traverse positions that define the extent of the carriage traverse, the traverse speed and the traverse data interval at which the traverse controller generates a trigger signal. In response to a start traverse signal, the traverse controller moves the carriage via the traversing unit based on the preprogrammed traverse parameters. If the traverse controller is implemented as the preferred 'SX 6 controller', in its operational mode, the traverse controller generates voltage pulses or an amount of current that are supplied to the traversing unit's motor to move the carriage from the first traverse position toward the second traverse position. Each voltage pulse or current increment causes the traversing unit to move the carriage over a predetermined interval. Therefore, by counting the voltage pulses or determining the amount of current output, the traverse controller can determine whether the carriage has moved over the preprogrammed traverse data interval. If so, the traverse controller activates the trigger signal. If not, the traverse controller continues to output voltage pulses or current to the traversing unit. In addition to tracking the count of voltage pulses or current to determine if the traversing unit has moved the carriage over the traverse data interval, the traversing unit also counts the voltage pulses or monitors current amount to determine whether the carriage has been driven over a complete traverse between the preprogrammed first and second traverse positions. If so, the traverse controller generates a traverse complete signal to signify the end of a traverse, and stops the carriage via the traversing unit.

Alternatively, rather than counting voltage pulses or current increments, the traversing unit's motor can include an encoder that generates a position signal that is coupled to the traverse controller and that indicates the traversing unit's (and therefore the carriage's) position to the traverse controller. Accordingly, the traverse controller can compare the traverse data interval (or whole number multiples thereof) with the position signal from the traversing unit, to generate the trigger signal upon moving the carriage over a traverse data interval. Similarly, the traverse controller can compare the traverse distance determined by subtracting the first and second traverse positions that define the traverse, with the position signal from the traversing unit, to generate a traverse complete signal upon moving the carriage over a complete traverse across the width of the sheet material.

The traverse controller 18 has a manual mode of operation. The user of the apparatus can input a manual mode command to the traverse controller by activating a button (not shown in FIG. 1) coupled to a control input of the traverse controller. In the manual mode of operation, the user can manipulate one of two direction buttons to command the traverse controller to move one way or the other, respectively, to a desired park position along the width of the sheet material. For example, the user can use the manual mode of operation to move the carriage to a desired park position to monitor the sheet material thickness at that position through periodic sampling performed by the processor, for example. Also, in the manual mode of operation, the user can direct the traverse controller to move the carriage past a side edge of the sheet material to a location where the user can readily replace the light source or otherwise service or maintain the apparatus.

The apparatus preferably includes a processor 19, a user interface 20, a memory 21 and a display 22. The processor, user interface, memory and display are preferably, although not necessarily, integrated together into a personal computer (PC) 23. The PC 23 can be one of a wide variety of commercially available PCs.

The processor 19 is coupled to the traverse controller 18. The processor 19 is also coupled to a position encoder 24 that generates an output signal indicative of the length of sheet material that has advanced through the apparatus relative to a predetermined reference point that is usually the position of the sheet material in the apparatus at the start of the traverse measurement operation. The encoder can include a wheel, for example, that engages either directly with the sheet material or with the guide member 5 if implemented as a roller. At every rotation or discrete fraction of a rotation of the encoder's wheel, the encoder generates an output signal such as a voltage pulse, that is coupled to the processor 19. Although for simplicity, the output signal from the encoder is coupled directly to the processor 19 in FIG. 1, it is preferred to feed the encoder's output signal to an encoder card interface housed in the PC 23. The encoder card can be one of a large variety of commercially available devices. The encoder card counts the pulses from the encoder output signal, where each pulse corresponds to a fixed distance interval. The processor reads the number of pulses counted by the encoder card, and converts the encoder count into predetermined measurement units by multiplication with position encoder conversion data pre-stored in the processor's memory. The processor stores the converted position encoder data in its memory in correspondence with sheet material thickness data.

The processor 19 is also coupled to receive the output signal from the light sensor 16. If the light sensor is implemented as a CCD array, a vision card, model no. 3033, manufactured by Vision Modules, Inc. of California, is preferably housed in the PC 23 and used as an interface between the processor 19 and the light sensor 16. More specifically, the vision card is coupled to receive the output signal from the light sensor, and generates a signal indicative of the location on the sensor's CCD linear array where the pixels transition from deactivated to activated states, or equivalently, the number of pixels that are activated or the number of pixels that are deactivated, and generates an output signal indicative of this position or number of activated or deactivated pixels. The processor 19 is coupled to receive the output signal from the vision card. The processor 19 is also coupled to receive the trigger signal generated by the traverse controller, preferably as an interrupt input. In response to activation of the trigger signal, the processor reads the number of pixels activated or deactivated from the vision card, subtracts the number of pixels activated or deactivated, respectively, that correspond to the apex elevation level of the break member, multiplies the difference in pixels by the light sensor conversion data to determine the thickness of the sheet material, and stores the resulting thickness value in memory in association with the traverse position. As the carriage traverses the sheet material, the processor thus generates in the memory an array of thickness values in correspondence with respective traverse positions. The processor also receives the traverse complete signal from the traverse controller each time a traverse of the sheet material is completed. Preferably, the traverse complete signal is in the form of a serial data message provided to the processor via its serial communication port. In response to the traverse complete signal, the processor reads the position encoder signal, preferably via the encoder card, and converts the encoder data into predetermined measurement units by multiplication with the position encoder conversion data. The processor stores the converted position encoder data in the memory in correspondence with the thickness data. Also, in response to the traverse complete signal, the processor reads the thickness data stored in the memory to determine minimum, maximum and average thickness values over the traverse and stores these values in the memory in respective data arrays in correspondence with the identity of the traverse (i.e., the stored position encoder data) to which these data values pertain. In addition, the processor can generate average thickness values over user-input window intervals along the width of the sheet material for a traverse, and store these values in the memory in correspondence with the identity of the traverse to which they pertain. The processor can also generate averages for respective user-specified bar intervals along the width of the sheet material, and store these values in the memory in association with the identity of the corresponding traverse. The processor then checks to determine whether a stop traverse signal has been activated by the user. If not, the processor activates a start traverse signal supplied to the traverse controller to commence the next traverse. If the user has activated the stop traverse signal, the processor stops the traverse measurement operation until the user activates the start traverse signal.

The processor is coupled to the display, and, based on the values calculated by the processor and stored in the memory, the processor can generate displays with a graph of thickness versus traverse position with associated window averages, a bar graph of thickness averages for respective bar intervals over the width of the sheet material, and a graph of minimum, maximum and average thickness versus position along the length of the sheet material. In addition, if the thickness data is read periodically at a given position along the traverse by the processor, the processor can generate a time-to-frequency domain transformation, preferably a fast Fourier transform (FFT), to identify periodic (and therefore non-random) variations in the thickness of the sheet material, for identification and diagnosis of manufacturing errors in the system.

The processor 19 is also coupled to the user interface 20 that can be implemented as a keyboard, mouse and/or a touchscreen through the use of the display 22, for example, to receive data input by a user of the apparatus. Using the interface 20, the user can input the first and second traverse positions that define the extent of the traverse, the traverse speed and the traverse data interval. The processor 19 sends the first and second traverse positions, the traverse speed and the traverse data interval, to the traverse controller 18 to control the carriage traverse in the traverse controller's automatic mode of operation. The user can utilize the interface to input start or stop traverse signals to the traverse controller to start or stop its automatic mode of operation. The user can also input record data using the interface 20. The record data can include the user's name, sheet material identification data, lot number, and the date and time at which the sheet material was examined for thickness. The processor 19 preferably stores the record data in the memory in correspondence with sheet material thickness values and corresponding traverse and encoder position data. At a later time, if the user desires, the user can use the interface to input a command to the processor to cause the processor to read and display the record data, thickness values, and traverse and encoder position data. For example, this feature allows the user to determine at a later time after the sheet material is manufactured whether a particular sheet material had thickness errors or the like.

The user can also input upper and lower thickness alarm limits to the processor using the interface, and the processor stores these values in the memory. The processor compares the thickness values calculated based on the output signal from the light sensor, and determines whether any calculated thickness value exceeds or falls below the upper and lower thickness alarm limits, respectively. If so, the processor generates an alarm signal supplied to alarm 25 that generates a visual or audio alarm, to draw the user's attention to the existence of the alarm condition. On the other hand, if the thickness values are within the range between the upper and lower alarm limits, the processor does not generate the alarm.

2. A Second Preferred Embodiment of the Apparatus

In addition to the first preferred embodiment, a second preferred embodiment of the apparatus of this invention is also shown in FIG. 1. This second embodiment of the apparatus is similar to the first embodiment, but includes some modifications and additional elements indicated in broken lines in FIG. 1. The second embodiment of the apparatus is particularly useful for high-precision thickness measurements, although it can be used for relatively imprecise measurements if desirable for a particular application.

The second embodiment of the invention takes into account variations over time in the break member's apex elevation level in performing sheet material thickness measurements. These level variations can be caused, for example, by eccentricities and imperfections in the break member and its mountings as well as deflection of the break member under force exerted by the sheet material against the break member due to the tension applied to the sheet material to advance it through the apparatus. These level variations can also be caused by expansion or contraction of the elements of the apparatus under ambient temperature or humidity changes, or wear of the apparatus elements over time. In the second embodiment of the invention, the break member's apex elevation level at any particular traverse position is determined through the use of an inductive gauging sensor 26. The inductive gauging sensor 26 detects the proximity of metal material to the sensor 26. Therefore, in the second embodiment of the invented apparatus, the sheet material should contain no metal, and at least the apex surface of the break member should include metal. The inductive gauging sensor can be an EX 500 series sensor commercially available from Keyence™, Inc. of Osaka, Japan. The inductive gauging sensor 26 is mounted to a stage 27. In turn, the stage is mounted to the carriage so that the sensor 26 opposes the apex of the break roller. The stage is capable of positioning the sensor 26 at a desired distance from the break member, preferably along the z-axis normal to the apex elevation level of the break member. In addition, to perform fine adjustments of the position of the sensor 26 over the apex of the break roller, the stage can include x- and y-axis controls. A suitable z-axis or x-, y- and z-axis stage is available from Parker™ Corporation of Cleveland, Ohio. Calibration of the inductive gauging sensor 26 using the stage 27 is performed by moving the sensor 26 to positions located at respective fixed, known distances from the break roller and noting the level of the respective output signals output by the sensor 26 at these known distances. The known output signal levels can be used by the inductive sensor's control circuitry to interpolate or extrapolate break roller apex elevation values corresponding to output signal levels from the sensor that are between the known levels. Therefore, in the second embodiment of the invented apparatus, it is not necessary to take break member apex elevation measurements with the light sensor, at each traverse position at which thickness measurements are to be taken across the entire traverse of the sheet material, as preferred in the first embodiment of the apparatus. To prepare for the operational mode of the second embodiment, the z-axis stage control also serves to position the inductive gauging sensor as close as possible to the sheet material at its apex elevation level, without actually contacting the sheet material. Preferably, to avoid degradation in the inductive gauging sensor's output signal by transmitting it over relatively long distances that would generally be required to directly couple the analog signal to the processor, the output signal from the inductive gauging sensor 26 is coupled to the traverse controller 18 that is normally positioned more closely to the carriage than the processor. The preferred traverse controller for the second embodiment of the apparatus is a programmable controller manufactured by Galil Motion Control™, Inc that has several convenient inputs, one of which can be used to receive the inductive gauging sensor's signal. The traverse controller captures the inductive gauging sensor's output signal when the traverse controller determines that it has move the carriage over the traverse data interval to a traverse position at which a thickness measurement is to be taken. The traverse controller captures, AID converts and stores the resulting value in the traverse controller's memory.

In the second embodiment of the invention, the light source 15 and the light sensor 16 are coupled to a light controller 28. Preferably, the light source 15, the light sensor 16 and the light controller 28 are implemented together as one integral unit such as the LS-3100/LS-3033 series laser scan micrometer commercially available from Keyence™, Inc. In this integral unit, the light controller controls the laser scan of the light source and the generation of the output signal generated by its light sensor, so that ultimately, the unit's light controller outputs an analog signal indicative of the apex elevation level of the sheet material. The output signal from the light controller is coupled to the traverse controller for A/D conversion, and the resulting converted light sensor signal is stored by the traverse controller in its memory.

Preferably, in the second embodiment, the output signal generated by the encoder is also coupled to the traverse controller, rather than coupling the output signal from the encoder to the processor via the encoder card. In this configuration, the traverse controller reads the encoder signal when it determines that it has moved the carriage over a traverse, and multiplies the encoder signal by encoder conversion data to convert the encoder output into predetermined measurement units.

In the second embodiment of the invention, the traverse controller accumulates converted light sensor data and inductive sensor data in correspondence with respective traverse positions. At the completion of a traverse, the traverse controller generates a traverse complete signal supplied to the processor. The processor, in response to the traverse complete signal, generates and outputs a send data signal to the traverse controller. In response to the send data signal from the processor, the traverse controller reads the inductive gauging sensor and light sensor data from its memory, and multiplies the inductive gauging sensor and the light sensor data with respective predetermined and prestored conversion data to convert the inductive gauging sensor and light sensor data into predetermined respective measurement units, for respective traverse positions over the traverse. The traverse controller then calculates sheet material thickness values by subtracting the converted inductive sensor data from the converted light sensor data for each traverse position, and stores the sheet material thickness values in its memory in correspondence with the traverse positions to which they pertain. Further, in response to the traverse complete signal, the processor generates a send data signal to the traverse controller. In response to the send data signal, the traverse controller sends the thickness measurement data in association with respective traverse positions, and the converted encoder count value, to the processor. Based on the thickness measurement data and respective traverse position data, and the encoder data received from the traverse controller, the processor determines minimum and maximum thickness values over the traverse, and thickness average(s) over the traverse, window and/or bar intervals. In the second embodiment, the processor can generate the same displays as generated by the first embodiment of the invention using the memory 21 and the display unit 22.

In either of the first and second embodiments, the traverse controller 18 can be coupled to switch the light source off after the expiration of a predetermined time limit, if no traverse measurement operation is to be performed. This feature of the invention increases the useful life of the light source. To implement this feature of the invention, for example, the traverse controller can be programmed to determine the elapsed time from the generation of a stop traverse signal from the processor or a traverse complete signal generated by the traverse controller, and to compare the elapsed time with a predetermined time limit value (specified by a user, for example) that is prestored in the traverse controller. If a start traverse signal is not issued within the expiration of the predetermined time limit value, the traverse controller switches off the light source. On the other hand, if a start traverse signal is received by the traverse controller within the predetermined time limit, the traverse controller does not switch off the light source as the light is still needed to perform sheet material thickness measurements.

Figure 2:
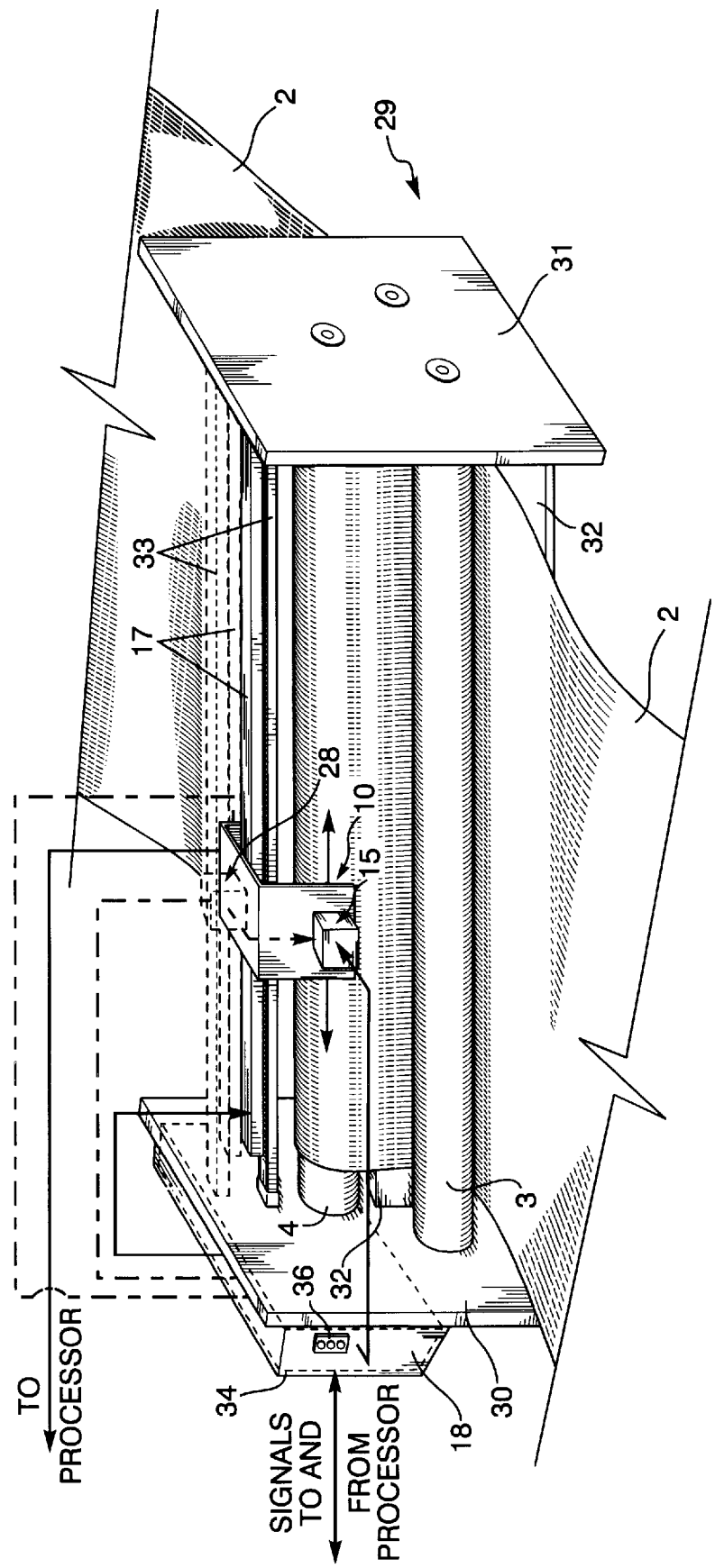
FIG. 2 is a perspective view of a portion of the apparatus in accordance with this invention that includes a traversing unit and carriage with mounted light source and light sensor.

FIG. 2 is a perspective view showing exemplary elements of the preferred apparatus for supporting the guide members, break member, the carriage, the traversing unit and the traverse controller. In FIG. 2, the apparatus includes a frame 29 that includes two opposing side plates 30, 31. The side plates are held in upright positions by beams 32, 33 that extend between and have ends attached to the side plates 30, 31. The beam 32 is positioned below the break member 4 and can be used as the support surface 9 for mounting the support rollers. The beam 33 supports the traversing unit 17 and can be one of two possible configurations for the first and second embodiments of the apparatus. For the first embodiment, the beam 33 can be positioned underneath the carriage in FIG. 2 with the traversing unit mounted to the top side of the beam, a position that allows ready access to the traversing unit for maintenance such as cleaning of lint or dust or replacing the light source. In the first embodiment, the underside of the carriage is preferably mounted to the traversing unit's movable platform. On the other hand, if the second embodiment is used, the preferred position of the light inductive gauging sensor underneath the carriage can complicate calibration of the inductive gauging sensor due to the location of the beam 33 and the traversing unit in this position. Accordingly, in the second embodiment, the beam 33 is preferably located above the carriage in FIG. 2, as indicated by the broken lines. In the second embodiment, the traversing unit is mounted to the underside of the beam with its movable platform attached to the carriage that hangs therefrom. It should be understood that there are a wide variety of possible ways to configure the carriage, the traversing unit and its support beam relative to the break member, as will readily occur to those of ordinary skill in this technological field.

Preferably, the traverse controller is mounted inside of a protective box 34 that is mounted to the outer side of one of the side plates 30, 31 (in FIG. 2, the box is mounted to the outer side of the side plate 30). The box 34 preferably has a hinged door to allow access to the traverse controller for programming and maintenance. Preferably, the outside of the box has buttons 36 or the like that are coupled to the traverse controller, and that a user can manipulate to switch the traverse controller between manual and automatic modes of operation or to move the carriage in one direction or the opposite direction across the width of the sheet material in the manual mode of operation.

The electric power and signals must be coupled from a stationary location such as a wall outlet or the traverse controller or processor, to the carriage that moves when traversing the sheet material. There are many ways to couple the power to and the signals to and from the components mounted to the carriage. Conductive cables coupled between the fixed location and components of the carriage can be held above the apparatus with a spring(s) or hook(s) suspended from the roof or a fixed surface above the level of the apparatus, that substantially holds the cables above the moving parts of the apparatus. Another option is to provide an additional beam (not shown) at an elevation below the carriage, that extends horizontally between the side plates 30, 31. The cables extend from the wall outlet, traverse controller or the processor through a hole in one of the side plates to an intermediate position on the beam between the side plates. At this intermediate position, the cables can be inserted into a first open end and through the interior of a segmented flexible conduit that has its first end fixed to the beam at the intermediate position. The second, opposite end of the segmented conduit through which the cables are inserted can be attached to the carriage and the ends of the cables can be coupled to appropriate components mounted on the carriage. As so arranged, the conduit has a U- or J-shaped configuration in which one side of the U- or J- rests on the beam. As the carriage traverses in the apparatus, the segmented conduit rolls back and forth in tractor tread-like fashion supported on its lower side by the beam.

FIG. 3 is a flow chart of processing performed by the processor 19 during preparation for the operational mode of the invented apparatus in which traverse measurements are performed. In FIG. 3, processing to prepare for the start of a traverse measurement operation begins in step S1. In step S2, the processor receives traverse parameters input by the user with the user interface 20, and stores the traverse parameters in the memory 21. The traverse parameters include the first and second traverse positions that define the outer extremes of the carriage traverse. The traverse parameters also include the traverse speed and the traverse data interval. The processor outputs the traverse parameters to the traverse controller 18 for storage in the traverse controller's memory. The user also inputs the aforementioned light sensor conversion data determined by calibration of the apparatus, into the memory 21. In addition, in the first embodiment, the processor determines and stores the break member apex elevation level calibration data that indicates the break member's apex elevation level at respective traverse positions separated by the traverse data interval, at which the thickness measurements are to be taken. This calibration operation is performed in response to a calibration command input by the user via the user interface 20, with the sheet material removed from the apparatus. In response to the calibration command, the processor issues the start traverse signal to the traverse controller and captures and converts the light sensor signal for storage in the memory 21, in response to the activation of the trigger signal by the traverse controller as it performs a traverse. The processor stores the converted light sensor signal data as calibration data indicative of the break member apex elevation level at each traverse position at which thickness measurements are to be taken. The user also inputs the encoder conversion data via the user interface, that the processor stores in the memory and uses to convert the output from the encoder into a value with predetermined measurement units. The processor also receives and stores some of the record data input by the user via the interface 20. For example, the user-input record data can include the user's identity, the time and date, and the lot and sheet numbers of the sheet material for which thickness measurements are to be taken. The record data can also include thickness measurements and respective lengthwise positions along the sheet material that are stored by the processor during the operational mode of the apparatus. The record data can be used for later reference and analysis to determine whether a particular sheet material had thickness errors at the time that the thickness measurements were performed. In addition, the processor receives from the user via the user interface an edge limit value that is used by the processor to determine the location of the sheet material's side edges.

In step S3 of FIG. 3, the processor generates and outputs a home command signal to the traverse controller to move the carriage to a predetermined home position. The homing of the carriage is necessary if the traversing unit is not of a type that generates an absolute position signal indicating the carriage's position to the traverse controller. Specifically, if the traversing unit generates no absolute carriage position signal, the traverse controller must be programmed with a reference point in relation to which the traverse controller can determine the carriage's position. The programming of this reference location into the traverse controller can be performed in a variety of ways, as will readily occur to those of ordinary skill in this art. For example, a limit switch can be attached in the apparatus at the predetermined home position between two additional limit switches positioned toward respective end extremes of the carriage traverse. The limit switches are coupled to inputs of the traverse controller so that the traverse controller can determine whether a limit switch has been tripped or not by the presence of the carriage. The traverse controller then commands the traversing unit to move the carriage in one direction until the traverse controller determines that either the home position limit switch or an end limit switch is tripped. If the home limit switch is tripped, the traverse controller controls the traversing unit to stop at the home position. On the other hand, if an end limit switch is tripped, the traverse controller controls the traversing unit to reverse direction and move toward the home position until the home limit switch is tripped, in response to which the traverse controller stops the traversing unit from moving the carriage. In response to the tripping of the home limit switch, the traverse controller initializes its memory so that it now has a reference position in relation to which the carriage position can be determined. After initialization of its memory, the traverse controller moves the carriage to the first traverse position. Also, in step S3, the processor initializes the position encoder count stored in either or both the memory and the encoder card, and the thickness data stored in the memory 21. In step S4, the processing of FIG. 3 ends.

Figure 4A:
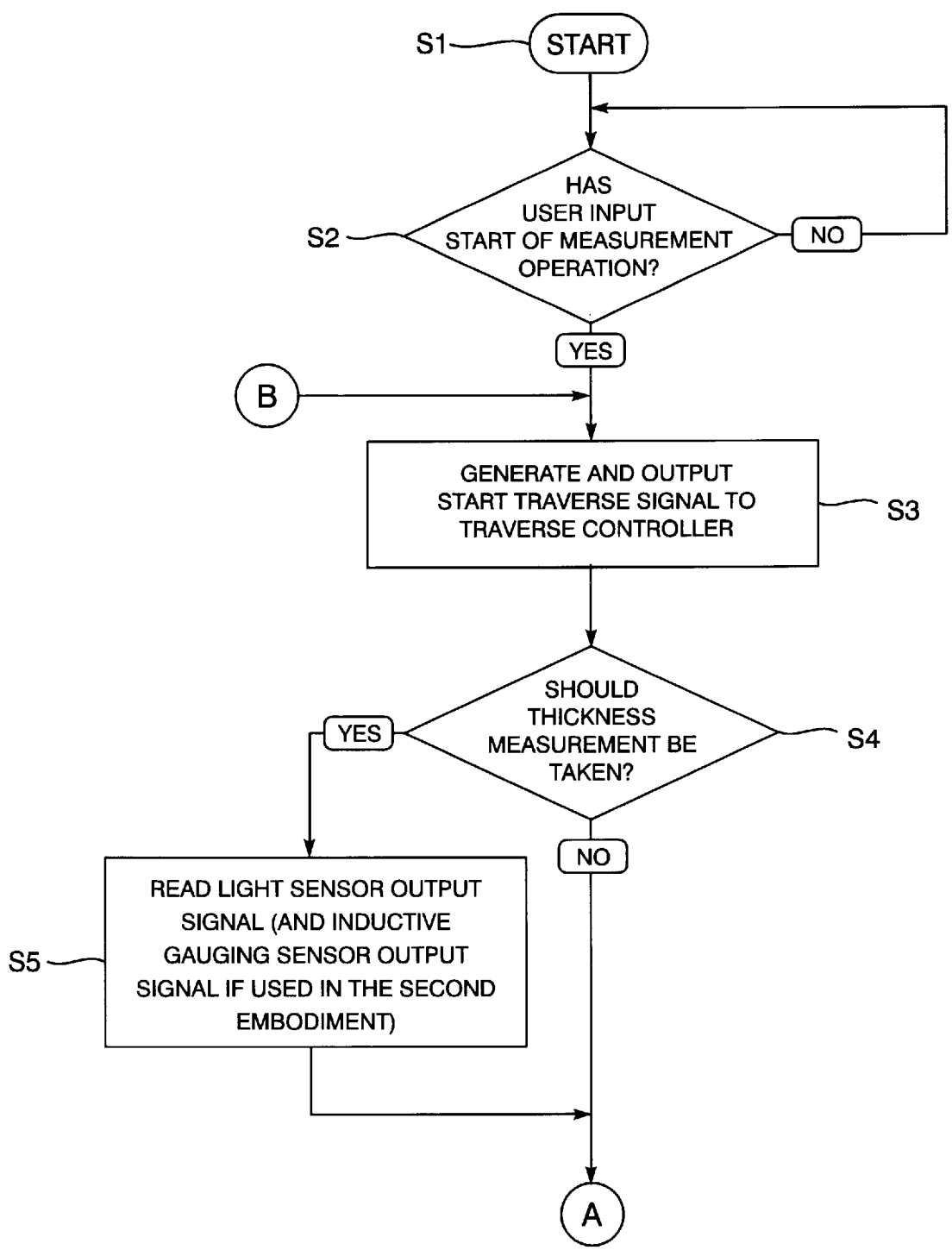
FIGS. 4A and 4B are flow charts of processing performed for the most part by the processor to generate sheet material data that includes thickness measurements with associated lengthwise positions, minimum and maximum thickness values, and average values over a traverse, respective window intervals or bar intervals.
Figure 4B:
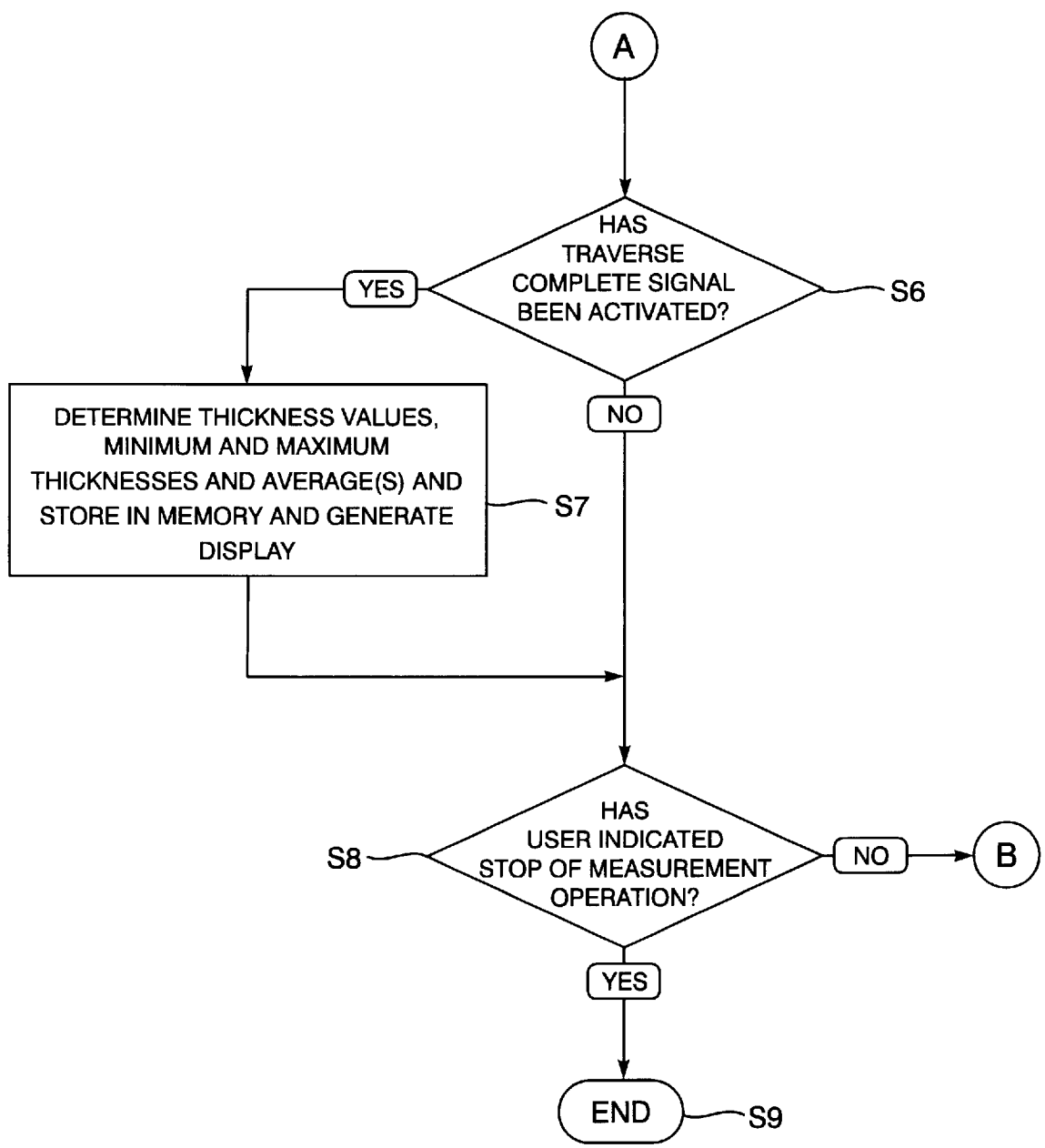

FIGS. 4A and 4B are flow charts of processing performed primarily by the processor to start, perform and end the traversing thickness measurement operation. In step S1 of FIG. 4A, the processing performed by the processor begins. In step S2 of FIG. 4A, the processor determines whether the user has input a start of measurement operation by manipulation of the interface 20. If not, the processor executes step S2 again after the elapse of a predetermined period of time. On the other hand, if the user has indicated the start of the traverse measurement operation, the processor generates and outputs the start traverse signal to the traverse controller in step S3 of FIG. 4A. In response to the traverse start signal, the traverse controller begins the movement of the carriage from the first traverse position toward the second traverse position.

In step S4 of FIG. 4A, a determination is made to establish whether any thickness measurements are available for acquisition. In the first embodiment of the invented apparatus, the processor performs this function by determining whether a trigger signal has been generated by the traverse controller in response to its control of the traversing unit to move the carriage over a traverse data interval. In the second embodiment of the invented apparatus, the traverse controller performs step S4 by determining whether the carriage has been moved over the a traverse data interval. If the determination in step S4 is affirmative, processing proceeds to step S5 in which, in the first embodiment of the apparatus, the processor reads the output from the light sensor 16, preferably via the vision card, multiplies the light sensor signal by the light sensor conversion data, and stores the resulting value in the memory 21 in correspondence with the traverse position to which the value pertains. In the second embodiment of the apparatus, the traverse controller performs step S4 by reading the output signals from the light sensor and the inductive gauging sensor, when the traverse controller determines that the carriage has been moved over the traverse data interval. The output signals read by the traverse controller are A/D converted and stored in the traverse controller's memory until completion of an entire traverse. After the conclusion of processing in step S5, or if a thickness measurement is not to be acquired in step S4, processing proceeds to step S6 of FIG. 4B.

In step S6, a determination is made by the processor to establish whether the traverse complete signal has been activated. If the traverse controller has activated the traverse complete signal, processing proceeds to step S7. In the first embodiment, step S7 is performed entirely by the processor. More specifically, the processor reads and subtracts the calibration data corresponding to the break member apex elevation level, from the converted light sensor signal corresponding to the sheet material apex elevation level, and stores the resulting sheet material thickness values in the memory 21 in correspondence with the traverse positions to which they pertain. The processor then calculates the minimum, maximum and average thickness values over the traverse just completed, as well as averages over the user-specified windows and/or bar intervals. The processor then reads the current encoder count, preferably via the encoder card, converts the encoder count into a predetermined measurement unit (e.g., feet) by multiplying the encoder count with encoder conversion data, and stores the converted encoder data in the memory 21 in correspondence with the thickness values, minimum, maximum and average values determined by the processor.

In the second embodiment, upon establishing that a traverse has been completed in step S6, the traverse controller outputs a traverse complete signal to the processor. In response to the traverse complete signal, the processor outputs a send data signal to the traverse controller. In response to the send data signal, the traverse controller performs step S7 by reading from its memory the A/D converted inductive gauging sensor data and the light sensor data, and multiplies the inductive gauging sensor data and the light sensor data by respective inductive gauging sensor and light sensor conversion data prestored in the traverse controller∝s memory, to convert the inductive gauging sensor data and the light sensor data into respective predetermined measurement units. The traverse controller then subtracts the converted inductive gauging sensor data corresponding to the break member apex elevation level, from the converted light sensor signal corresponding to the sheet material apex elevation level, and stores the resulting sheet material thickness value in its memory in correspondence with the traverse positions to which they pertain. Also in response to a send data signal from the processor that is generated by the processor in response to the traverse controller's traverse complete signal, the traverse controller outputs the sheet material thickness data and corresponding traverse positions for the traverse to the processor. In addition, in response to the processor's send data signal, the traverse controller reads the position encoder output that is preferably coupled to the traverse controller in the second embodiment, converts the encoder output into a value with predetermined measurement units by multiplication of the encoder output with the encoder conversion data previously stored in the traverse controller's memory, and outputs the converted encoder count value to the processor. The processor then calculates the minimum, maximum and average thickness values over the traverse just completed, as well as averages over the user-specified windows and/or bar intervals. The processor can also generate several different displays, as described with respect to FIGS. 6–9, based on the sheet material thickness data and corresponding traverse position data, the minimum, maximum and average values over the traverse, as well as the average values over the user-specified windows and bar intervals. After performing step S7, or if the determination in step S6 is negative, processing proceeds to step S8.

In step S8, a determination is made by the processor to determine whether the user has indicated a stop of measurement command. If not, the processor returns to perform step S3 of FIG. 4A. On the other hand, if the user input a stop measurement command to the processor via the user interface 21, the processor terminates processing in step S9.

Figure 5A:
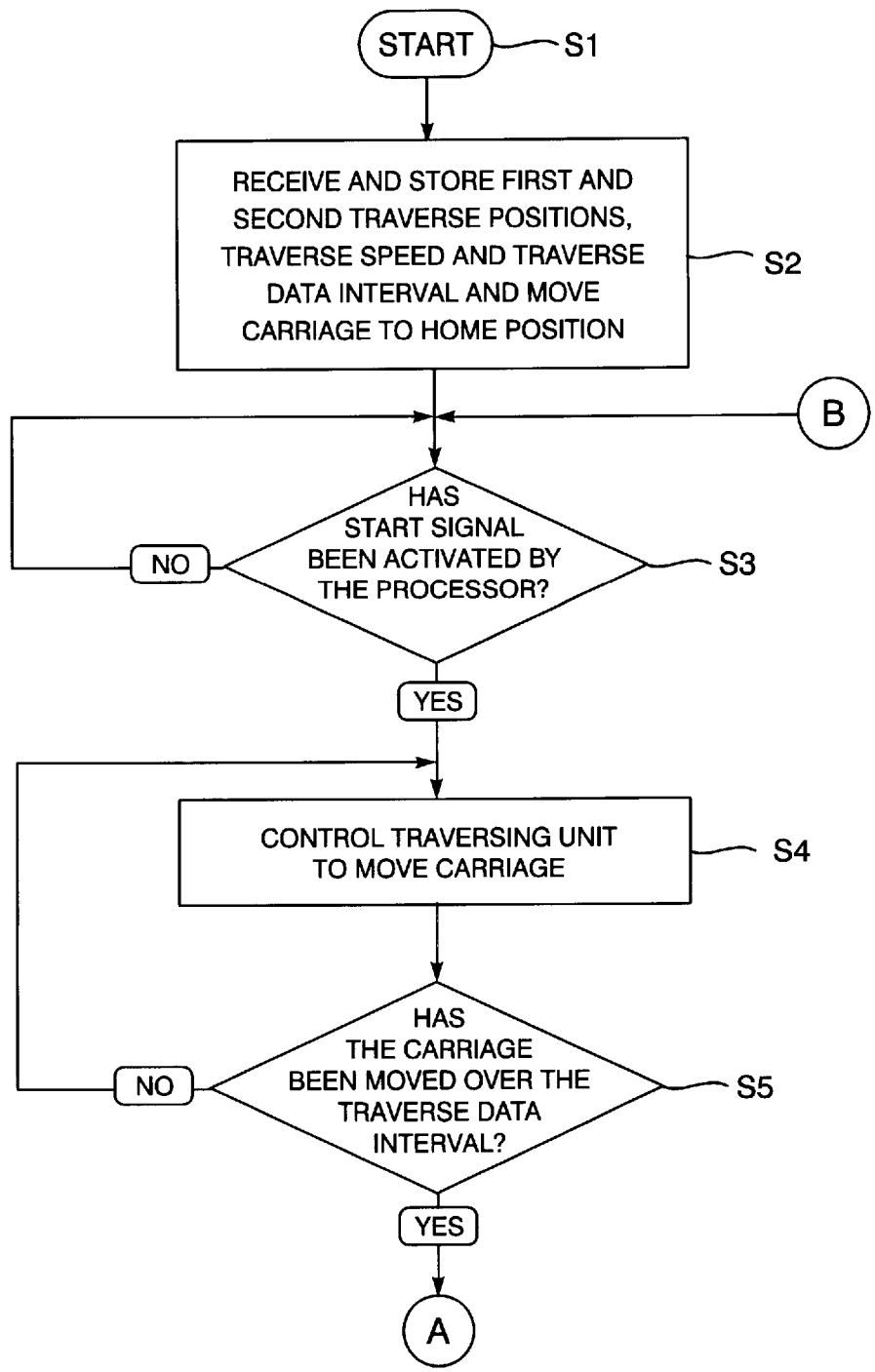
FIG. 5A and 5B are flow charts of processing performed, for the most part, by the traverse controller to prepare for and perform traverse control of the carriage via the traversing unit.
Figure 5B:
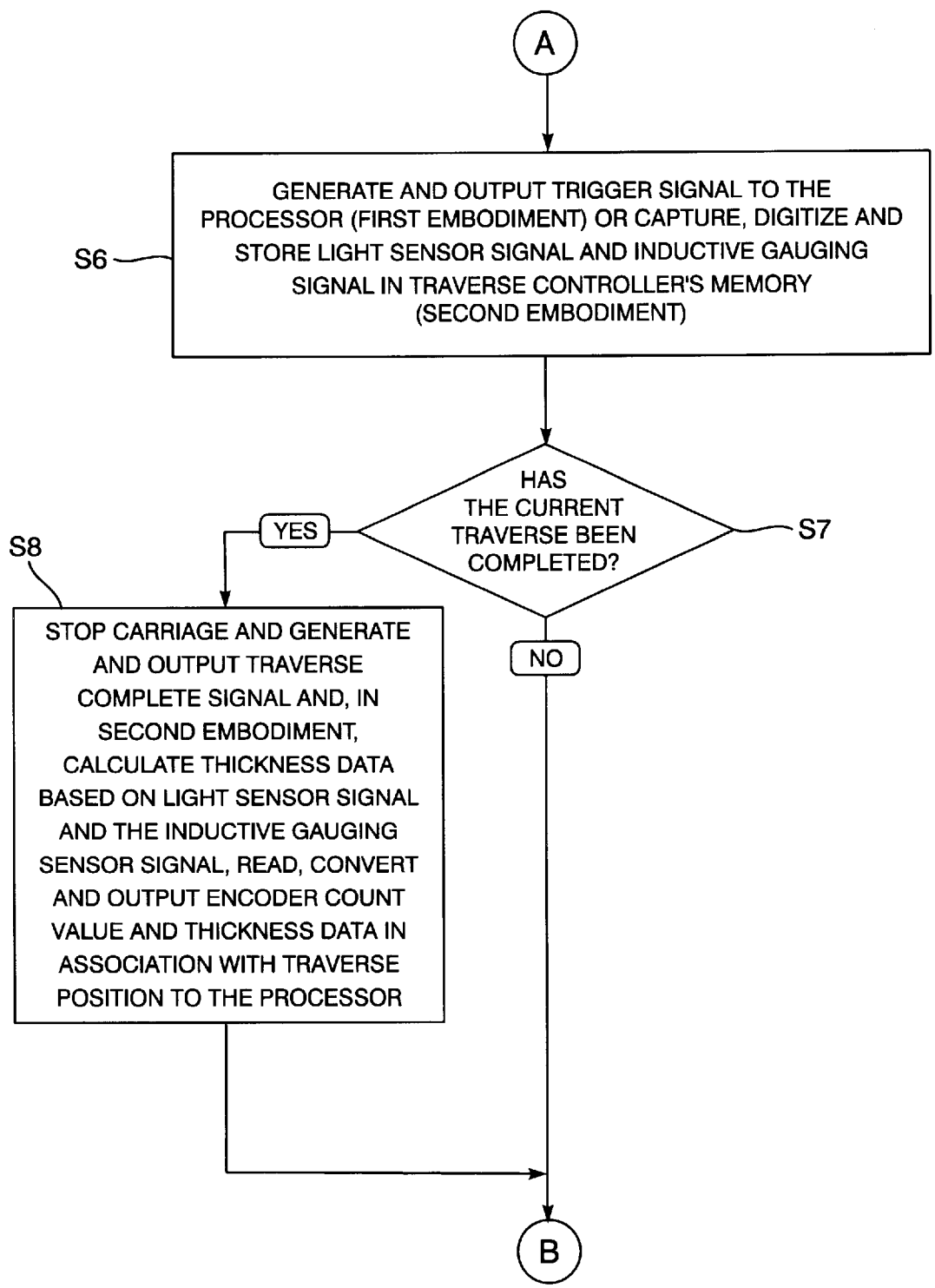

FIGS. 5A and 5B are flowcharts of processing performed primarily by the traverse controller to start, perform and stop the traverse operation. In step S1 of FIG. 5A, the traverse controller begins processing. In step S2, the traverse controller receives and stores the first and second traverse positions, the traverse speed and the traverse data interval. In the preferred embodiments, the processor generates and outputs the home position signal to the traverse controller to cause it to move the carriage to the home position. The traverse controller determines the location of the home position by a limit switch centrally located between two limit switches positioned toward the outer extremes of the traverse. Upon receiving the home position signal from the processor, the traverse controller moves the carriage via the traversing unit, in a predetermined direction. If the home position limit switch is tripped, the traverse controller stops the carriage at the home position by controlling the traversing unit to stop. On the other hand, if the traverse controller trips one of the end limit switches, the traverse controller moves the carriage in the opposite direction to the home position indicated by the home limit switch. The traverse controller then initializes its internal position encoder so that the traverse controller has a reference position so that the traverse controller can determine the carriage traverse position as it controls the traversing unit to move the carriage. Thereafter, the traverse controller moves the carriage to the first traverse position via the traversing unit.

In step S3, the traverse controller determines whether the start traverse signal has been activated by the processor. If not, the traverse controller again performs the determination of step S3 after the elapse of a predetermined period of time. On the other hand, if the start signal has been activated by the processor, for example, in response to a start traverse command from the user via the user interface in step S4 of FIG. 5A, the traverse controller enters the automatic mode of operation and controls the traversing unit to move the carriage across the sheet material toward one of the first and second traverse positions defining the outer extreme positions of the traverse. In step S5, the traverse controller determines whether the carriage has been moved over the traverse data interval. If not, the traverse controller's processing returns to step S4 to continue to control the traversing unit to move the carriage across the sheet material. On the other hand, if the traverse controller determines that the carriage has been moved over the traverse data interval across the width of the sheet material in step S5, for example, by determining the number of voltage pulses or current amount generated and supplied by the traverse controller to the traversing unit and comparing the counted pulses or current amount with a number or amount needed to drive the carriage over the traverse data interval or by receiving the position signal from the traversing unit and comparing the position signal with the traverse data interval, the traverse controller takes one of two actions in step S6 of FIG. 5B, depending on whether the first or second embodiment is used. In the first embodiment, if the traverse controller determines that the carriage has been moved over the traverse data interval, the traverse controller activates the trigger signal output to the processor. In the second embodiment, if the traverse controller determines that the carriage has been moved over the traverse data interval, the traverse controller captures, digitizes, and stores the output signals from the light sensor and the inductive gauging sensor, in step S6 of FIG. 5B.

In step S7, a determination is made to establish whether the traverse has been completed. The traverse controller determines that the carriage has moved completely across the sheet material in one complete traverse, for example, by counting the voltage pulses or current amount output to the traversing unit and comparing the counted pulses or current amount to a predetermined number of pulses or current amount needed to move the carriage over a complete traverse, or by receiving the position signal from the traversing unit and comparing the signal with the traverse distance determined by subtracting the first and second traverse positions. If the counted pulses or current amount equals or exceeds the number necessary to move the carriage over the traverse distance, or if the position signal from the traversing unit equals or exceeds the traverse distance, the traverse controller stops the traversing unit's motor drive in step S8. In addition, the traverse controller generates a traverse complete signal supplied to the processor. In the first embodiment, the processor calculates the various sheet material thickness values, minimum, maximum and average thickness values over the traverse, window(s) and/or bar interval(s), based on the light sensor signal values accumulated over the traverse, and the calibration data stored in the processor's memory. In the second embodiment, in response to the traverse complete signal, the processor generates and outputs a send data command signal supplied to the traverse controller. The traverse controller also calculates the sheet material thickness values at respective traverse positions, by subtracting the inductive gauging sensor after conversion with the inductive gauging sensor conversion data, and the light sensor signal after conversion with the light sensor conversion data, to generate a difference value indicative of the thickness of the sheet material at respective traverse positions over the traverse. Preferably, the traverse controller reads the encoder count data and converts the encoder count data into predetermined measurement units by multiplication with the encoder conversion data. In response to the send data command signal from the processor generated in response to the traverse complete signal, the traverse controller sends the sheet material thickness data and respective traverse positions along with the encoder count value, to the processor. After the completion of step S8 or if in step S7 the traverse controller determines that the counted number of pulses or drive current amount is less than that required to drive the carriage across one complete traverse of the sheet material or if the position signal from the traversing unit is less than the traverse distance, processing returns to step S3. If the processor again activates the start traverse signal in step S3, the traverse controller will perform step S4 to drive that carriage in the reverse direction it had driven the carriage in the previous traverse. Specifically, if the carriage is positioned at the first traverse position, the traverse controller is programmed to drive the carriage via the traversing unit, toward the second position. On the other hand, if the traverse controller determines that the carriage is positioned at the second traverse position when the processor generates a start traverse signal, the traverse controller is programmed to drive the carriage via the traversing unit toward the first position.

Figure 6:
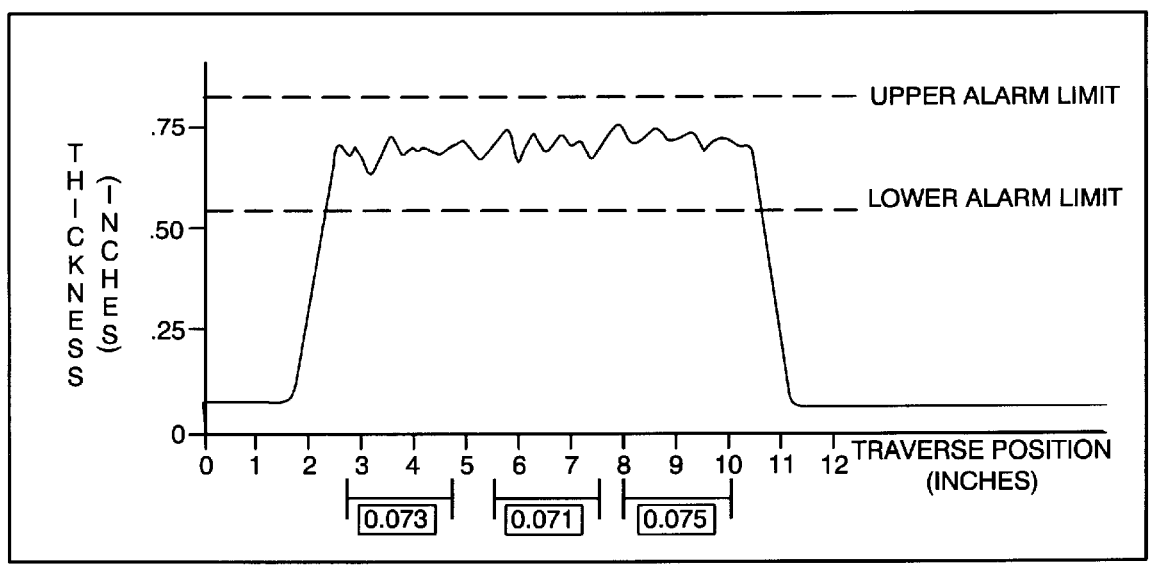
FIG. 6 is a display generated by the apparatus of sheet material thickness versus traverse position indicating window intervals and associated average thickness values.

FIGS. 6 through 9 are exemplary displays generated by the processor using the memory and the display. In performing the processing of FIGS. 4A, 4B, 5A, 5B, the processor produces an array of sheet material thickness values in correspondence with respective traverse position values across the width of the sheet material and respective encoder distance values along the length of the sheet material. In FIG. 6, the processor reads the sheet material thickness values and respective traverse position values, and generates a display including a graph of the sheet material thickness versus traverse position. In addition, the processor preferably indicates in the display of FIG. 6 the upper and lower alarm limits that are input to the processor by the user using the user interface, and stored in the memory. The stored upper and lower alarm limits are used by the processor to generate the upper and lower alarm limit levels that are graphically displayed in FIG. 6. The window intervals whose traverse position and width are indicated by the user via the user interface, are also received by the processor and stored in the memory for use by the processor in generating the graphical representation of the window(s) (three are shown in FIG. 6) in the display. In FIG. 6, the processor displays the windows as a "├─┤" graphical symbol at respective window positions below the traverse position axis of the graph. Preferably, the processor also retrieves the average thickness values for the respective windows from the memory, and displays these values below respective window intervals in the display. The processor establishes the location of the sheet material's edges for the display by determining the two traverse positions on either side of the sheet material, that have corresponding thickness values that just exceed the predetermined edge limit value prespecified by the user and stored in the processor's memory via the user interface and processor.

Figure 7:
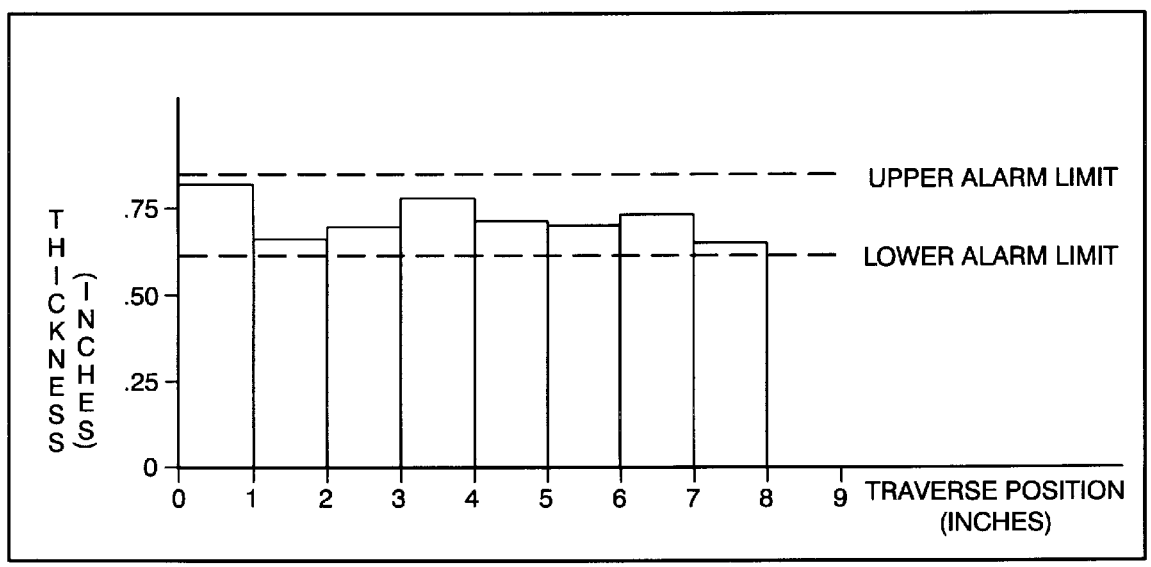
FIG. 7 is a display generated by the apparatus that includes a bar graph of sheet material thickness versus traverse position that indicates the average thicknesses of successive bar intervals across the sheet material's width.

As shown in FIG. 7, the processor can retrieve bar interval averages from the memory and use these values to generate a display. More specifically, the processor can use the bar interval averages retrieved from the memory to generate graphical indications of the average values in correspondence with respective bar intervals across the width of the sheet material. The processor preferably uses the sheet material's left-side edge to left-justify the sheet material thickness so that the traverse position value begins at a value of zero, a feature which allows the user to more readily determine the value of a traverse position. The left-justify feature can be used with any graph generated by the processor, as understood by those of ordinary skill in this technological field.

Figure 8:
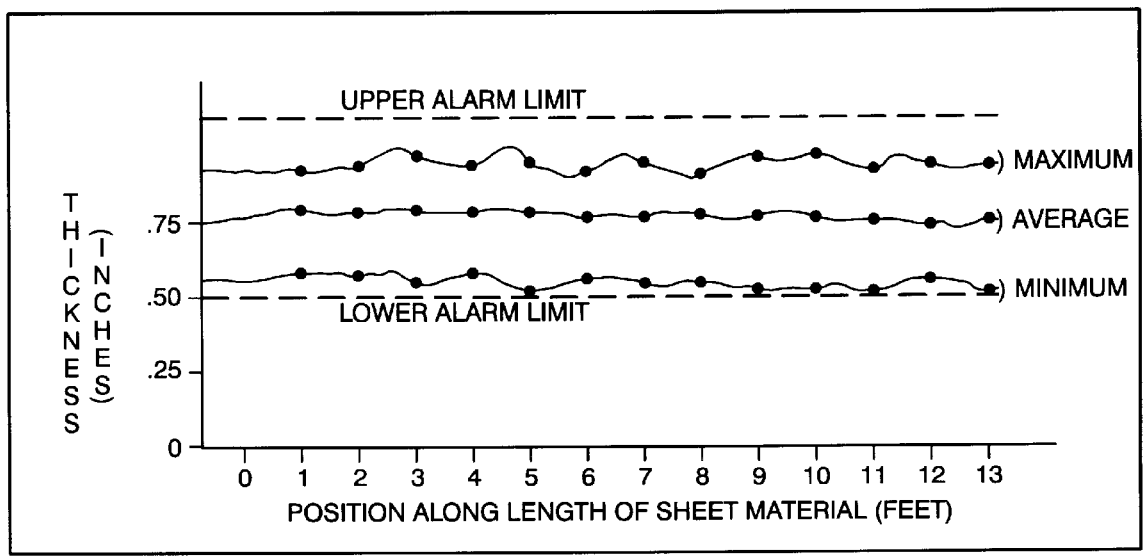
FIG. 8 is a display generated by the apparatus that includes a graph of maximum, minimum and average sheet material thicknesses versus longitudinal position along the length of the sheet material.

FIG. 8 is a display of a graph of sheet material thickness versus minimum, maximum and average thickness values per traverse, versus position along the length of the sheet material, that is generated by the processor using the memory and display. In addition, the processor can retrieve the stored upper and lower alarm limits from the memory and display these limit values graphically.

Figure 9:
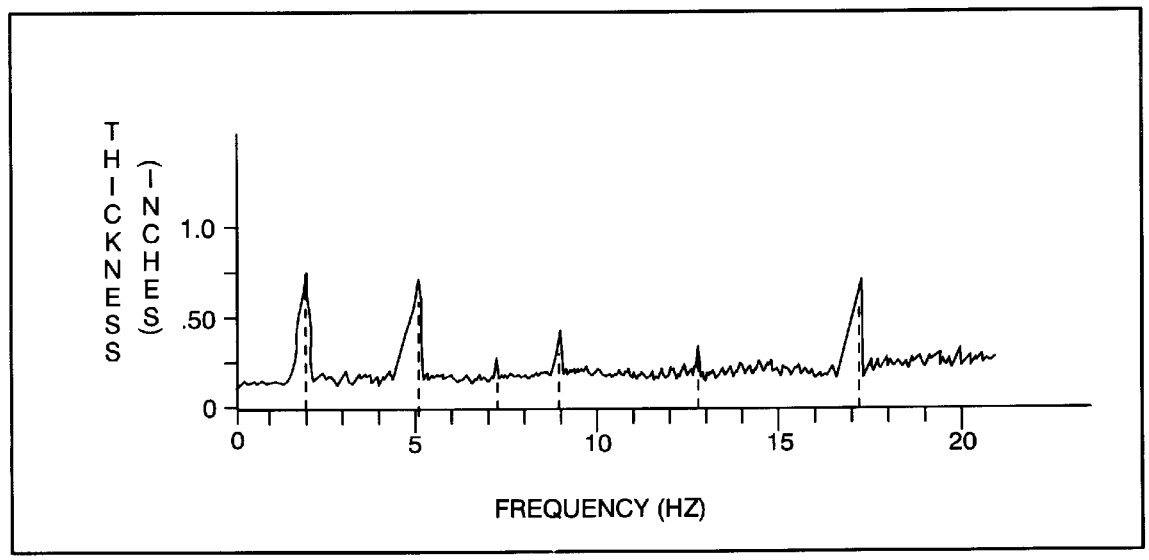
FIG. 9 is a display generated by the apparatus that includes a graph of signal strength versus frequency derived by time-to-frequency domain transformation of the thickness values along the length of the sheet material.

As previously mentioned, the processor can perform a time-to-frequency domain transformation of the thickness measurement data for a particular traverse position stored in the memory, using an FFT, for example, and stores the resulting frequency values in the memory. The processor retrieves the frequency values from the memory for use in generating a display of the sheet material thickness versus frequency, as shown in FIG. 9. To generate this graph, the processor reads thickness values from the memory, performs an FFT on these values and generates the display with a graph of the resulting thickness amplitude versus frequency. Spikes in the thickness amplitude (see, for example, the amplitude spikes occurring at roughly 2, 5, 7, 9, 13 and 17 Hertz) are indicative of non-random variations in the thickness. The display of FIG. 9 can thus be used to identify frequencies of periodic errors introduced into the manufacture of the sheet material by correlating the spike frequencies with machinery used in the manufacturing process to determine what machinery is introducing the periodic error into the sheet material thickness. By readily identifying the machinery that is creating errors in sheet material thickness, the machinery can be repaired or corrected to eliminate sheet material thickness errors.

A method in accordance with this invention includes a step of folding a sheet material along a first direction, and a step of advancing the sheet material along a second direction that is transverse to the first direction. The method also includes a step of mounting a light source and a light sensor on opposite sides of a carriage, and a step of situating the carriage so that the light source and light sensor face opposite sides of a folded portion of the sheet material. The method further includes a step of illuminating a first side of the folded portion of the sheet material with the light source, and receiving light on a second side of the folded sheet material that is not blocked by the folded sheet material, with the light sensor, the received light being proportional to the thickness of the sheet material. In addition, the method includes a step of traversing the carriage along the first direction, and a step of displaying the sheet material thickness in correspondence with traverse position on the sheet material along the first direction, based on the light received. The method can also include a step of determining an average value of the thickness of the sheet material over a predetermined interval along the first direction, in which the average thickness value is displayed in correspondence with the predetermined interval.

The many features and advantages of the present invention are apparent from the detailed specification and thus, it is intended by the appended claims to cover all such features and advantages of the described apparatus, system and methods which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

We claim:

1. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light, the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

a traversing unit coupled to the carriage and supported in the apparatus, the traversing unit moving the carriage along the first direction;

a traverse controller coupled to the traversing unit and generating a control signal to cause the carriage to move along the first direction;

the traverse controller generating a trigger signal after each time that the traverse controller causes the traversing unit to move the carriage over a predetermined distance interval along the first direction, the processor coupled to receive the trigger signal from the traverse controller, and the processor receiving the signal from the light sensor, in response to the trigger signal; and a display unit coupled to the processor, the display unit generating a display based on the display signal from the processor, the traverse controller generating the control signal as an amount of current supplied to a motor of the traversing unit, that is necessary to cause the traversing unit to move the carriage along the first direction, the traverse controller generating a trigger signal after each time the traverse controller outputs the amount of current.

2. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light;

the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

a traversing unit coupled to the carriage and supported in the apparatus, the traversing unit moving the carriage along the first direction;

a traverse controller coupled to the traversing unit and generating a control signal to cause the carriage to move along the first direction;

the traverse controller generating a trigger signal after each time that the traverse controller causes the traversing unit to move the carriage over a predetermined distance interval along the first direction, the processor coupled to receive the trigger signal from the traverse controller, and the processor receiving the signal from the light sensor, in response to the trigger signal; and a display unit coupled to the processor, the display unit generating a display based on the display signal from the processor, the display unit generating a display representative of the thicknesses of the sheet material at respective positions separated by predetermined traverse data intervals across the sheet material along the first direction.

3. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light, the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

a traversing unit coupled to the carriage and supported in the apparatus, the traversing unit moving the carriage along the first direction;

a traverse controller coupled to the traversing unit and generating a control signal to cause the carriage to move along the first direction;

the traverse controller generating a trigger signal after each time that the traverse controller causes the traversing unit to move the carriage over a predetermined distance interval along the first direction, the processor coupled to receive the trigger signal from the traverse controller, and the processor receiving the signal from the light sensor, in response to the trigger signal; and a display unit coupled to the processor, the display unit generating a display based on the display signal from the processor, wherein a user of the apparatus inputs a predetermined window interval specifying first and second positions on the sheet material along the first direction, the processor averaging values of the sheet material thickness values occurring in the predetermined window interval to generate an average thickness value, and the processor generating the display signal, based on the average thickness value and the predetermined window interval, and wherein the display unit generates a display representative of the predetermined window interval and the average thickness value over the window interval, based on the display signal.

4. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light, the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

a traversing unit coupled to the carriage and supported in the apparatus, the traversing unit moving the carriage along the first direction;

a traverse controller coupled to the traversing unit and generating a control signal to cause the carriage to move along the first direction;

the traverse controller generating a trigger signal after each time that the traverse controller causes the traversing unit to move the carriage over a predetermined distance interval along the first direction, the processor coupled to receive the trigger signal from the traverse controller, and the processor receiving the signal from the light sensor, in response to the trigger signal; and a display unit coupled to the processor, the display unit generating a display based on the display signal from the processor, wherein a user of the apparatus inputs a predetermined bar interval corresponding to an interval of the sheet material along the first direction, the processor averaging sheet material thickness values occurring in adjacent bar intervals that are acquired as the traverse controller moves the carriage across the sheet material, to generate an average thickness value over each bar interval along the first direction from a first side to a second side of the sheet material, the processor generating the display signal based on the average thickness value for each bar interval, and the display unit generating the display that indicates the average thickness values in correspondence with respective bar intervals from the first side to the second side of the sheet material, based on the display signal.

5. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light, the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

a traversing unit coupled to the carriage and supported in the apparatus, the traversing unit moving the carriage along the first direction;

a traverse controller coupled to the traversing unit and generating a control signal to cause the carriage to move along the first direction;

the traverse controller generating a trigger signal after each time that the traverse controller causes the traversing unit to move the carriage over a predetermined distance interval along the first direction, the processor coupled to receive the trigger signal from the traverse controller, and the processor receiving the signal from the light sensor, in response to the trigger signal; and a display unit coupled to the processor, the display unit generating a display based on the display signal from the processor, wherein a user of the apparatus inputs a plurality of predetermined window intervals on the sheet material along the first direction, and the processor averages sheet material thickness values occurring in respective predetermined window intervals to generate respective average thickness values, the processor generating the display signal, based on the average thickness values for respective window intervals, and the display unit generating a display indicating the predetermined window intervals in correspondence with respective average thickness values, based on the display signal.

6. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light, the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

a traversing unit coupled to the carriage and supported in the apparatus, the traversing unit moving the carriage along the first direction; and a traverse controller coupled to the traversing unit and generating a control signal to cause the carriage to move along the first direction, wherein a user of the apparatus can input a command to the traverse controller to move the carriage to a predetermined position past a side edge of the sheet material.

7. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light, the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

a traversing unit coupled to the carriage and supported in the apparatus, the traversing unit moving the carriage along the first direction; and a traverse controller coupled to the traversing unit and generating a control signal to cause the carriage to move along the first direction, the traverse controller coupled to the light source, the traverse controller deactivating the light source if the traverse controller receives no signal commanding movement of the carriage within a predetermined time period.

8. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light, the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

a traversing unit coupled to the carriage and supported in the apparatus, the traversing unit moving the carriage along the first direction; and a traverse controller coupled to the traversing unit and generating a control signal to cause the carriage to move along the first direction, wherein the signal generated by the processor based on the light sensor's signal is a display signal, the apparatus further comprising:

a display unit coupled to receive the signal generated by the processor, and generating a display of the thickness of the sheet material, based on the display signal;

the processor coupled to the traverse controller, and wherein a user of the apparatus commands the processor to move the carriage to a park position over the sheet material along the first direction, the processor generating a park position signal supplied to the traverse controller, the traverse controller moving the carriage to the park position, based on the park position signal, the processor receiving the signal from the light sensor at predetermined time intervals, and generating the display signal based on the received signals.

9. An apparatus as claimed in claim 8, wherein the processor performs a time-to-frequency domain transformation on the periodically-received signal from the light sensor, and generates the display signal based on the time-to-frequency domain transformation.

10. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light, the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

a traversing unit coupled to the carriage and supported in the apparatus, the traversing unit moving the carriage along the first direction; and a traverse controller coupled to the traversing unit and generating a control signal to cause the carriage to move along the first direction, wherein the signal generated by the processor based on the light sensor's signal, is a display signal, the apparatus further comprising:

a display unit coupled to receive the signal generated by the processor, and generating a display of the thickness of the sheet material, based on the display signal;

a position encoder coupled to the processor and coupled to move as the sheet material advances in the apparatus, the encoder generating a signal indicative of a position along a length of the sheet material in the second direction as the sheet material advances in the apparatus, the processor generating maximum, minimum and average values of the received signal for respective traverses of the carriage across the sheet material along the first direction, and the processor generating the display signal based on the maximum, minimum and average values for respective traverses across the sheet material, and the respective position along the length of the sheet material corresponding to the maximum, minimum and average values determined by the processor based on the encoder's signal.

11. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light, the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

a traversing unit coupled to the carriage and supported in the apparatus, the traversing unit moving the carriage along the first direction; and a traverse controller coupled to the traversing unit and generating a control signal to cause the carriage to move along the first direction, wherein the signal generated by the processor based on the light sensor's signal, is a display signal, the apparatus further comprising:

a display unit coupled to receive the signal generated by the processor, and generating a display of the thickness of the sheet material, based on the display signal;

wherein the user inputs record data including at least one of a user identity, date and time of traverse measurement, and sheet material identification data, the apparatus further comprising:

a position encoder coupled to the processor and coupled to move as the sheet material advances in the apparatus, the encoder generating a signal indicative of a position along a length of the sheet material in the second direction as the sheet material advances in the apparatus; and a memory unit coupled to the processor, the processor storing average sheet material thickness values in correspondence with respective distance intervals along the length of the sheet material, as a portion of the record data.

12. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light, the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

wherein the signal generated by the processor based on the signal from the light sensor, is a display signal, and wherein the break roller includes metal and the sheet material contains no metal, the apparatus further comprising:

an inductive gauging sensor mounted on the carriage in proximity to the break member, the inductive gauging sensor generating a signal indicative of a distance between the inductive gauging sensor and the break member;

a traverse controller coupled to receive the signal from the light sensor and the signal from the inductive gauging sensor at a respective traverse position, the traverse controller controlling the movement of the carriage across the sheet material and generating sheet material thickness data in correspondence with respective traverse position data, based on the light sensor signal and the inductive gauging sensor signal, generating a traverse complete signal based on completion of a traverse, and outputting the sheet material thickness data with respective traverse position data, in response to a send data signal;

the processor coupled to the traverse controller, and generating a send data signal in response to the traverse complete signal, and generating the display signal based on the sheet material thickness data and the traverse position data, the apparatus further comprising:

a display unit coupled to the processor, generating a display of the thickness of the sheet material, based on the display signal; and a mechanical stage mounted between the carriage and the inductive gauging sensor, for calibrating the inductive gauging sensor.

13. A method comprising the steps of:
a) folding a sheet material along a first direction;
b) advancing the sheet material along a second direction transverse to the first direction;
c) mounting a light source and a light sensor on opposite sides of a carriage;
d) situating the carriage so that the light source and light sensor face opposite sides of a folded portion of the sheet material;
e) illuminating a first side of the folded portion of the sheet material with the light source;
f) receiving light on a second side of the folded sheet material that is not blocked by the folded sheet material, with the light sensor, the received light being proportional to the thickness of the sheet material;
g) traversing the carriage along the first direction with a traverse controller; and
h) displaying the sheet material thickness in correspondence with traverse position on the sheet material along the first direction at locations across the sheet material that are programmed into the traverse controller, based on the light received in said step (f); and
i) determining an average value of the thickness of the sheet material over any predetermined interval across the sheet material, and
the step of displaying in said step (f) displaying the average thickness value in correspondence with the predetermined interval.

14. An apparatus as claimed in claim 13, wherein a user specifies the predetermined interval by indicating first and second positions on the sheet material along the first direction, said step (h) of displaying including the substep of averaging values of the sheet material thickness values occurring in the predetermined interval to generate an average thickness value for display in said step (h).

15. An apparatus as claimed in claim 13, wherein a user specifies the predetermined interval, said step (h) of displaying including a substep of averaging sheet material thickness values occurring in a plurality of adjacent intervals, and said step (h) displaying the average thickness value over each interval along the first direction.

16. An apparatus as claimed in claim 13, wherein a user inputs a plurality of predetermined intervals on the sheet material along the first direction, said step (h) including a substep of averaging sheet material thickness values occurring in respective predetermined intervals to generate respective average thickness values, said step (h) displaying the average thickness values in correspondence with respective intervals.

17. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light, the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

wherein the signal generated by the processor based on the signal from the light sensor is a display signal, the apparatus further comprising:

an inductive gauging sensor mounted on the carriage in proximity to the break member, the inductive gauging sensor generating a signal indicative of a distance between the inductive gauging sensor and the break member, the processor capable of generating the display signal, based on the signal from the inductive gauging sensor in addition to the signal generated by the light sensor.

18. An apparatus as claimed in claim 17, further comprising:

a traversing unit coupled to the carriage and supported in the apparatus, the traversing unit moving the carriage along the first direction; and a traverse controller coupled to the traversing unit and generating a control signal to cause the carriage to move along the first direction.

19. An apparatus as claimed in claim 18, further comprising:

a display unit coupled to receive the display signal generated by the processor, and generating a display based on the display signal.

20. An apparatus as claimed in claim 17, further comprising:

a display unit coupled to receive the display signal generated by the processor, and generating a display based on the display signal.

21. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light, the light source and light sensor included in a laser scan micrometer; and a processor coupled to receive the signal indicative of the thickness of the sheet material from the light sensor, the processor capable of generating a signal indicative of the thickness of the sheet material at any location across the sheet material independently of the angular position of the break member, based on the signal from the light sensor;

wherein the signal generated by the processor is a display signal, the apparatus further comprising:

a display unit coupled to receive the display signal, and generating a display indicative of the thickness of the sheet material at any location across the sheet material, based on the display signal;

wherein the signal generated by the processor is a display signal, and wherein the carriage is moved to a park position over the sheet material along the first direction, the processor generating the display signal at predetermined time intervals.

22. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light;

a traversing unit coupled to the carriage and supported in the apparatus, the traversing unit moving the carriage along the first direction;

a traverse controller coupled to the traversing unit and generating a control signal to cause the carriage to move along the first direction, the traverse controller generating a trigger signal after each time that the traverse controller causes the traversing unit to move the carriage over a predetermined distance interval along the first direction, a processor coupled to receive the trigger signal from the traverse controller and coupled to receive the signal from the light sensor, the processor receiving the signal from the light sensor, in response to the trigger signal, the processor determining and generating a signal indicative of the thickness of the sheet material, based on the signal from the light sensor, and the processor generating a display signal based on the signal indicative of the thickness of the sheet material;

a display unit coupled to the processor, the display unit generating a display based on the display signal from the processor, and the traverse controller generating the control signal as an amount of current supplied to a motor of the traversing unit, that is necessary to cause the traversing unit to move the carriage along the first direction, the traverse controller generating a trigger signal after each time the traverse controller outputs the amount of current.

23. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, light sensor generating a signal indicative of the thickness of the sheet material, based on the received light;

a traversing unit coupled to the carriage and supported in the apparatus, the traversing unit moving the carriage along the first direction; and a traverse controller coupled to the traversing unit and generating a control signal to cause the carriage to move along the first direction, the traverse controller generating a trigger signal after each time that the traverse controller causes the traversing unit to move the carriage over a predetermined distance interval along the first direction;

a processor coupled to receive the trigger signal from the traverse controller and coupled to receive the signal from the light sensor, the processor receiving the signal from the light sensor, in response to the trigger signal, the processor determining and generating a signal indicative of the thickness of the sheet material, based on the signal from the light sensor, and the processor generating a display signal based on the signal indicative of the thickness of the sheet material; and a display unit coupled to the processor, the display unit generating a display based on the display signal from the processor, the display unit generating a display representative of the thicknesses of the sheet material at respective positions separated by predetermined traverse data intervals across the sheet material along the first direction.

24. An apparatus as claimed in claim 23, further comprising:

at least one support roller mounted in the machine and engaging with an underside of the break roller for support.

25. An apparatus as claimed in claim 24, wherein the break member has a coating of chromium.

26. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light;

a traversing unit coupled to the carriage and supported in the apparatus, the traversing unit moving the carriage along the first direction; and a traverse controller coupled to the traversing unit and generating a control signal to cause the carriage to move along the first direction, the traverse controller generating a trigger signal after each time that the traverse controller causes the traversing unit to move the carriage over a predetermined distance interval along the first direction;

a processor coupled to receive the trigger signal from the traverse controller and coupled to receive the signal from the light sensor, the processor receiving the signal from the light sensor, in response to the trigger signal, the processor determining and generating a signal indicative of the thickness of the sheet material, based on the signal from the light sensor, and the processor generating a display signal based on the signal indicative of the thickness of the sheet material; and a display unit coupled to the processor, the display unit generating a display based on the display signal from the processor, wherein a user of the apparatus inputs a predetermined window interval specifying first and second positions on the sheet material along the first direction, the processor averaging values of the sheet material thickness values occurring in the predetermined window interval to generate an average thickness value, and the processor generating the display signal, based on the average thickness value and the predetermined window interval, and the display unit generating a display representative of the predetermined window interval and the average thickness value over the window interval, based on the display signal.

27. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light;

a traversing unit coupled to the carriage and supported in the apparatus, the traversing unit moving the carriage along the first direction;

a traverse controller coupled to the traversing unit and generating a control signal to cause the carriage to move along the first direction, the traverse controller generating a trigger signal after each time that the traverse controller causes the traversing unit to move the carriage over a predetermined distance interval along the first direction;

a processor coupled to receive the trigger signal from the traverse controller and coupled to receive the signal from the light sensor, the processor receiving the signal from the light sensor, in response to the trigger signal, the processor determining and generating a signal indicative of the thickness of the sheet material, based on the signal from the light sensor, and the processor generating a display signal based on the signal indicative of the thickness of the sheet material; and a display unit coupled to the processor, the display unit generating a display based on the display signal from the processor, the display unit generating a display representative of the thicknesses of the sheet material at respective positions separated by predetermined traverse data intervals across the sheet material along the first direction, wherein a user of the apparatus inputs a predetermined bar interval corresponding to an interval of the sheet material along the first direction, the processor averaging sheet material thickness values occurring in adjacent bar intervals that are acquired as the traverse controller moves the carriage across the sheet material, to generate an average thickness value over each bar interval along the first direction from a first side to a second side of the sheet material, the processor generating the display signal based on the average thickness value for each bar interval, and the display unit generating the display that indicates the average thickness values in correspondence with respective bar intervals from the first side to the second side of the sheet material, based on the display signal.

28. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light;

a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light;

a traversing unit coupled to the carriage and supported in the apparatus, the traversing unit moving the carriage along the first direction; and a traverse controller coupled to the traversing unit and generating a control signal to cause the carriage to move along the first direction, the traverse controller generating a trigger signal after each time that the traverse controller causes the traversing unit to move the carriage over a predetermined distance interval along the first direction;

a processor coupled to receive the trigger signal from the traverse controller and coupled to receive the signal from the light sensor, the processor receiving the signal from the light sensor, in response to the trigger signal, the processor determining and generating a signal indicative of the thickness of the sheet material, based on the signal from the light sensor, and the processor generating a display signal based on the signal indicative of the thickness of the sheet material; and a display unit coupled to the processor, the display unit generating a display based on the display signal from the processor, the display unit generating a display representative of the thicknesses of the sheet material at respective positions separated by predetermined traverse data intervals across the sheet material along the first direction, wherein a user of the apparatus inputs a plurality of predetermined window intervals on the sheet material along the first direction, and the processor averages sheet material thickness values occurring in respective predetermined window intervals to generate respective average thickness values, the processor generating the display signal, based on the average thickness values for respective window intervals, and the display unit generating a display indicating the predetermined window intervals in correspondence with respective average thickness values, based on the display signal.

29. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light; and a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light;

a traversing unit coupled to the carriage and supported in the apparatus, the traversing unit moving the carriage along the first direction; and a traverse controller coupled to the traversing unit and generating a control signal to cause the carriage to move along the first direction, wherein a user of the apparatus can input a command to the traverse controller to move the carriage to a predetermined position past a side edge of the sheet material.

30. An apparatus as claimed in claim 29, wherein the light source includes a light bulb.

31. An apparatus as claimed in claim 29, further comprising:

an array of optical fibers coupled to the light source, that directs the light toward the sheet material.

32. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light; and a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light;

a traversing unit coupled to the carriage and supported in the apparatus, the traversing unit moving the carriage along the first direction; and a traverse controller coupled to the traversing unit and generating a control signal to cause the carriage to move along the first direction, the traverse controller coupled to the light source, the traverse controller deactivating the light source if the traverse controller receives no signal commanding movement of the carriage within a predetermined time period.

33. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light; and a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light;

a traversing unit coupled to the carriage and supported in the apparatus, the traversing unit moving the carriage along the first direction;

a traverse controller coupled to the traversing unit and generating a control signal to cause the carriage to move along the first direction;

a processor coupled to receive the signal from the light sensor, and generating a display signal indicative of the sheet material thickness, based on the signal from the light sensor; and a display unit coupled to the processor to receive the display signal, and generating a display of the thickness of the sheet material, the processor coupled to the traverse controller, and wherein a user of the apparatus commands the processor to move the carriage to a park position over the sheet material along the first direction, the processor generating a park position signal supplied to the traverse controller, the traverse controller moving the carriage to the park position, based on the park position signal, the processor receiving the signal from the light sensor at predetermined time intervals, and generating a display signal based on the received signals.

34. An apparatus as claimed in claim 33, wherein the processor performs a time-to-frequency domain transformation on the periodically-received signal from the light sensor, and generates the display signal based on the time-to-frequency domain transformation.

35. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light; and a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light;

a traversing unit coupled to the carriage and supported in the apparatus, the traversing unit moving the carriage along the first direction;

a traverse controller coupled to the traversing unit and generating a control signal to cause the carriage to move along the first direction;

a processor coupled to receive the signal from the light sensor, and generating a display signal indicative of the sheet material thickness, based on the signal from the light sensor;

a display unit coupled to the processor to receive the display signal, and generating a display of the thickness of the sheet material; and a position encoder coupled to the processor and coupled to move as the sheet material advances in the apparatus, the encoder generating a signal indicative of a position along a length of the sheet material in the second direction as the sheet material advances in the apparatus, the processor generating maximum, minimum and average values of the received signal for respective traverses of the carriage across the sheet material along the first direction, and the processor generating the display signal based on the maximum, minimum and average values for respective traverses across the sheet material, and the respective position along the length of the sheet material corresponding to the maximum, minimum and average values determined by the processor based on the encoder's signal.

36. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light; and a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light;

a traversing unit coupled to the carriage and supported in the apparatus, the traversing unit moving the carriage along the first direction;

a traverse controller coupled to the traversing unit and generating a control signal to cause the carriage to move along the first direction;

a processor coupled to receive the signal from the light sensor, and generating a display signal indicative of the sheet material thickness, based on the signal from the light sensor; and a display unit coupled to the processor to receive the display signal, and generating a display of the thickness of the sheet material, the user inputting record data including at least one of a user identity, date and time of traverse measurement, and sheet material identification data, the apparatus further comprising:

a position encoder coupled to the processor and coupled to move as the sheet material advances in the apparatus, the encoder generating a signal indicative of a position along a length of the sheet material in the second direction as the sheet material advances in the apparatus; and a memory unit coupled to the processor, the processor storing average sheet material thickness values in correspondence with respective distance intervals along the length of the sheet material, as a portion of the record data.

37. An apparatus for measuring thickness of a sheet material advancing through the apparatus, the apparatus comprising:

a break member supported in the apparatus and having a central axis extending along a first direction transverse to a second direction in which the sheet material advances through the apparatus, the advancing sheet material folding by contact with the break member;

a carriage supported in the apparatus in proximity to the break member and capable of moving along the first direction;

a light source mounted to the carriage in proximity to a first side of the break member, and generating light; and a light sensor mounted to the carriage in proximity to a second side of the break member, the light sensor receiving light from the light source that is not blocked by the sheet material at a position at which the sheet material folds in contact with the break member, the light sensor generating a signal indicative of the thickness of the sheet material, based on the received light;

the break roller including metal and the sheet material containing no metal, the apparatus further comprising:

an inductive gauging sensor mounted on the carriage in proximity to the break member, the inductive gauging sensor generating a signal indicative of a distance between the inductive gauging sensor and the break member;

a traverse controller coupled to receive the signal from the light sensor and the signal from the inductive gauging sensor at a respective traverse position, the traverse controller controlling the movement of the carriage across the sheet material and generating sheet material thickness data in correspondence with respective traverse position data, based on the light sensor signal and the inductive gauging sensor signal, generating a traverse complete signal based on completion of a traverse, and outputting the sheet material thickness data with respective traverse position data, in response to a send data signal;

a processor coupled to the traverse controller, and generating a send data signal in response to the traverse complete signal, and generating a display signal based on the sheet material thickness data and the traverse position data;

a display unit coupled to the processor, generating a display of the thickness of the sheet material, based on the display signal; and a mechanical stage mounted between the carriage and the inductive gauging sensor, for calibrating the inductive gauging sensor.

* * * * *